(12) United States Patent
Maeda

(10) Patent No.: US 11,554,630 B2
(45) Date of Patent: *Jan. 17, 2023

(54) VEHICULAR AIR CONDITIONER HAVING HEATING HEAT EXCHANGER DISPOSED DOWNSTREAM OF BLOWER FAN

(71) Applicant: DENSO CORPORATION, Kariya (JP)

(72) Inventor: Kenichiro Maeda, Kariya (JP)

(73) Assignee: DENSO CORPORATION, Kariya (JP)

( * ) Notice: Subject to any disclaimer, the term of this patent is extended or adjusted under 35 U.S.C. 154(b) by 373 days.

This patent is subject to a terminal disclaimer.

(21) Appl. No.: 16/837,934

(22) Filed: Apr. 1, 2020

(65) Prior Publication Data

US 2020/0223282 A1 Jul. 16, 2020

Related U.S. Application Data

(63) Continuation of application No. PCT/JP2018/035983, filed on Sep. 27, 2018.

(30) Foreign Application Priority Data

Oct. 20, 2017 (JP) .............................. JP2017-203685

(51) Int. Cl.
*B60H 1/00* (2006.01)

(52) U.S. Cl.
CPC ..... *B60H 1/00564* (2013.01); *B60H 1/00021* (2013.01); *B60H 1/00064* (2013.01); *B60H 1/00285* (2013.01); *B60H 1/00321* (2013.01); *B60H 1/00521* (2013.01); *B60H 1/00828* (2013.01); *B60H 2001/00092* (2013.01);
(Continued)

(58) Field of Classification Search
CPC ............ B60H 1/00564; B60H 1/00021; B60H 1/00064; B60H 1/00285; B60H 1/00321; B60H 1/00521; B60H 1/00828; B60H 2001/00092; B60H 2001/00107; B60H 2001/00135

See application file for complete search history.

(56) References Cited

U.S. PATENT DOCUMENTS 5,267,896 A * 12/1993 Petters ............... B60H 1/00457
454/126
6,079,484 A * 6/2000 Uemura ............. B60H 1/00064
165/204
(Continued)

FOREIGN PATENT DOCUMENTS

JP 2016011101 A 1/2016

OTHER PUBLICATIONS

U.S. Appl. No. 16/837,952, filed Apr. 1, 2020, Maeda.

*Primary Examiner* — Ljiljana V. Ciric
(74) *Attorney, Agent, or Firm* — Harness, Dickey & Pierce, P.L.C.

(57) ABSTRACT

A vehicular air conditioner includes a casing, a blower fan, and a heating heat exchanger that is disposed in the casing. The heating heat exchanger is disposed downstream of the blower fan. The blower fan is disposed to extend over a first outside air space, a second outside air space, a first inside air space, and a second inside air space. The rotational direction of the blower fan is set so that each of the plurality of blades of the blower fan passes through the first inside air space, the first outside air space, the second outside air space, and the second inside air space in this order when the plurality of blade are rotating.

7 Claims, 15 Drawing Sheets

(52) U.S. Cl.
CPC .............. *B60H 2001/00107* (2013.01); *B60H 2001/00135* (2013.01)

(56) References Cited

U.S. PATENT DOCUMENTS

| | | | | |
|---|---|---|---|---|
| 6,093,096 | A * | 7/2000 | Miyata | B60H 1/00457 |
| | | | | 454/165 |
| 6,119,463 | A * | 9/2000 | Bell | B60N 2/5657 |
| | | | | 62/3.61 |
| 6,606,866 | B2 * | 8/2003 | Bell | B60N 2/5657 |
| | | | | 62/3.3 |
| 6,907,739 | B2 * | 6/2005 | Bell | B60H 1/2225 |
| | | | | 62/3.3 |
| RE44,272 | E * | 6/2013 | Bell | 310/58 |
| 9,802,463 | B2 * | 10/2017 | Maeda | B60H 1/00849 |
| 9,981,525 | B2 * | 5/2018 | Sekito | B60H 1/00028 |
| 10,611,207 | B2 * | 4/2020 | Ryu | B60H 1/00535 |
| 11,254,187 | B2 * | 2/2022 | Maeda | B60H 1/00471 |
| 2002/0017102 | A1 * | 2/2002 | Bell | B60N 2/5635 |
| | | | | 62/3.7 |
| 2009/0026813 | A1 * | 1/2009 | Lofy | B60N 2/5635 |
| | | | | 165/104.31 |
| 2016/0221414 | A1 * | 8/2016 | Nakamura | B60H 1/00328 |
| 2016/0236535 | A1 * | 8/2016 | Kuwayama | B60H 1/00678 |
| 2016/0288609 | A1 * | 10/2016 | Yamaoka | B60H 1/00678 |
| 2018/0298914 | A1 * | 10/2018 | Nakamura | B60H 1/00471 |
| 2019/0017515 | A1 * | 1/2019 | Sekito | F04D 29/44 |
| 2019/0255905 | A1 * | 8/2019 | Tsumagari | B60H 1/00064 |
| 2019/0270359 | A1 * | 9/2019 | Kato | B60H 1/00028 |
| 2019/0291531 | A1 * | 9/2019 | Kono | B60H 1/00021 |
| 2019/0351735 | A1 * | 11/2019 | Kawano | A47C 7/74 |
| 2020/0028455 | A1 * | 1/2020 | Kosaka | H02P 6/182 |
| 2020/0062075 | A1 * | 2/2020 | Hirosue | B60H 1/00471 |
| 2020/0173445 | A1 * | 6/2020 | Kono | F24F 1/0022 |
| 2020/0223281 | A1 * | 7/2020 | Ide | B60H 1/00521 |
| 2020/0223282 | A1 * | 7/2020 | Maeda | B60H 1/00321 |
| 2020/0223289 | A1 * | 7/2020 | Maeda | B60H 1/00471 |
| 2020/0269885 | A1 * | 8/2020 | Murakami | B61D 27/0018 |

* cited by examiner

VEHICULAR AIR CONDITIONER HAVING HEATING HEAT EXCHANGER DISPOSED DOWNSTREAM OF BLOWER FAN

CROSS REFERENCE TO RELATED APPLICATIONS

This application is a continuation application of International Patent Application No. PCT/JP2018/035983 filed on Sep. 27, 2018, which designated the U.S. and claims the benefit of priority from Japanese Patent Application No. 2017-203685 filed on Oct. 20, 2017. The entire disclosure of all of the above applications is incorporated herein by reference.

TECHNICAL FIELD

The present disclosure relates to a vehicular conditioner which conditions an air in a vehicle cabin.

BACKGROUND ART

Two-layer vehicle air conditioners have been known wherein at least a part of an air passage in a casing constituting an external structure is divided into a driver-side outside air passage, a passenger-side outside air passage, a driver-side inside air passage, and a passenger-side inside air passage by a partition member. In such a vehicular air conditioner, a blower fan is arranged downstream of a heat exchanger such as a heater core that adjusts a temperature of air, and partition members located upstream and downstream of the blower fan are located relatively offset from each other in the rotational direction of the blower fan.

SUMMARY

According to one aspect of the present disclosure, a vehicular air conditioner includes:

a casing that defines an air passage through which an air flows;

a blower fan that includes a plurality of blades arranged in a circumferential direction about a fan axis, the blower fan configured to generate an airflow in the air passage to be supplied to the vehicle cabin by rotating the plurality of blades about the fan axis; and a heating heat exchanger that is disposed in the casing to heat the air flowing through the air passage.

The air passage is divided into an outside air passage through which an outside air from an outside of the vehicle cabin flows and an inside air passage through which an inside air from the vehicle cabin circulates. The heating heat exchanger is disposed downstream of the blower fan in the casing, The outside air passage includes a first outside air space for guiding an outside air to the driver's seat in the vehicle cabin and a second outside air space for guiding an outside air to the passenger seat in the vehicle cabin. The inside air passage includes a first inside air space for guiding an inside air to the driver's seat in the vehicle cabin and a second inside air space for guiding an inside air to the passenger seat in the vehicle cabin.

The blower fan is disposed to extend across the first outside air space, the second outside air space, the first inside air space, and the second inside air space. Then, the blower fan rotates the blades in the rotational direction such that the blades pass through the first inside air space, the first outside air space, the second outside air space, and the second inside air space in this order.

DESCRIPTION OF EMBODIMENTS

Figure 1:
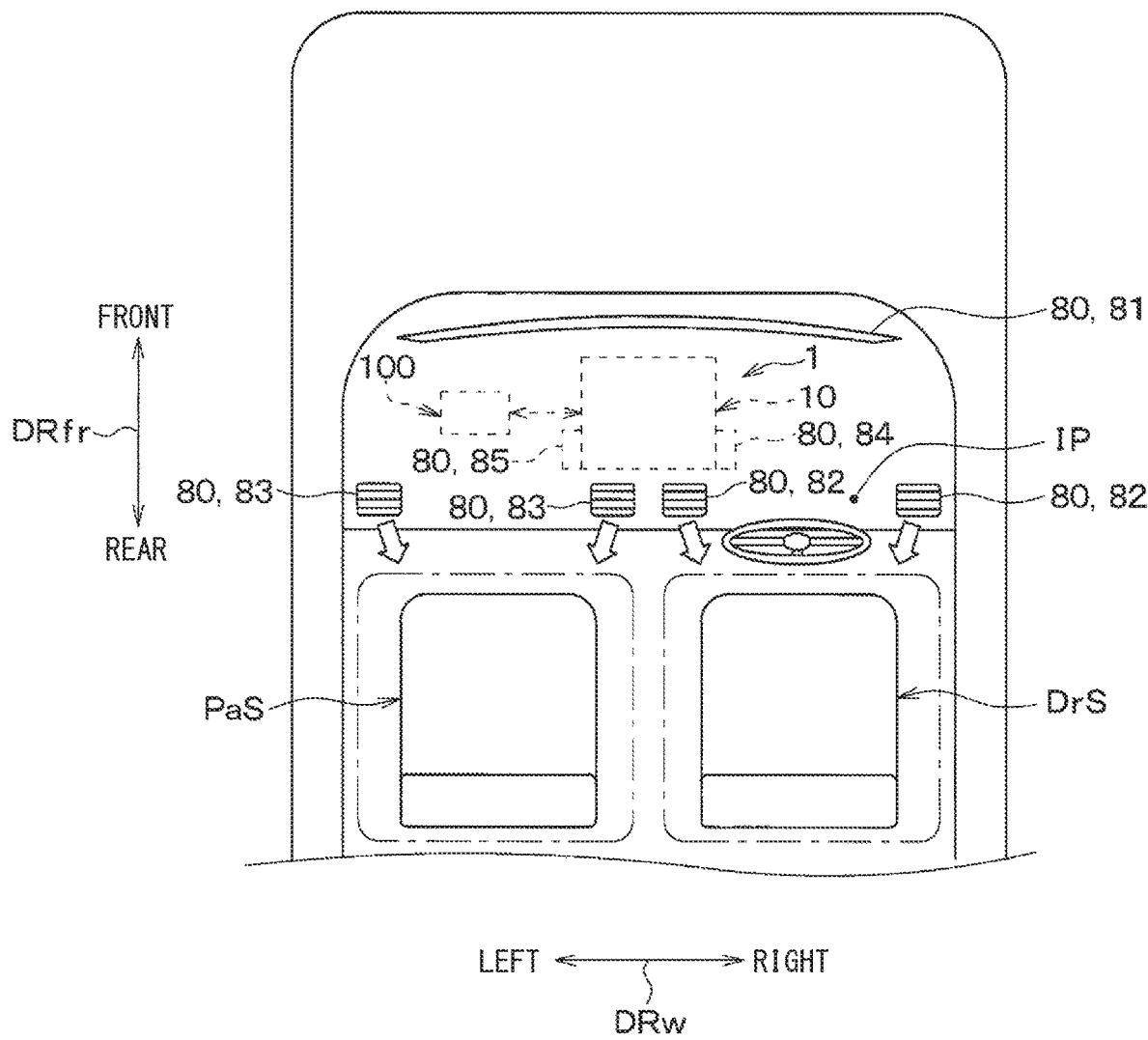
FIG. 1 is an explanatory diagram for explaining a mounting position of a vehicular air conditioner in a vehicle.

Embodiments of the present disclosure will be described below with reference to the drawings. In the following embodiments, portions that are the same as or equivalent to those described in the preceding embodiments are denoted by the same reference numerals, and a description of the same or equivalent portions may be omitted. In addition, when only a part of the components is described in the embodiment, the components described in the preceding embodiment can be applied to other parts of the components. In the following embodiments, the embodiments can be partially combined with each other as long as the embodiments do not cause any trouble in combination, even if the combination is not specified in particular.

To begin with, a relevant technology will be described only for understanding the following embodiments.

There is an advantage in an inside/outside air two-layer type vehicular air conditioner in that, during an inside/outside air two-layer mode, an outside air introduced from an outside of the vehicle cabin is supplied to a window glass in the vehicle cabin to prevent fogging, while improving a heating efficiency by circulating an inside air in the vehicle cabin.

The inventors of the present disclosure have made intensive studies to further improve air-conditioning performance by a vehicular air conditioner having an inside/outside air two-layer mode. As a result, in a vehicular air conditioner having the inside/outside air two-layer mode, when a low-temperature outside air and a high-temperature inside air are introduced into the blower fan, the heat capacity of the blower fan causes heat transfer between the inside air passage and the outside air passage. Then, it was found that the temperature of the air flowing through the outside air passage was increased. The fact that the temperature of the air flowing through the outside air passage is increased by the heat capacity of the blower fan may contribute to the improvement of the air conditioning performance, since the relative humidity of the air flowing through the outside air passage is reduced due to the increase in temperature, and as a result the anti-fog capability is improved.

However, in a typical vehicular air conditioner, the blower fan is disposed downstream of the heater core, and the temperature difference between the outside air and the inside air drawn into the blower fan is reduced by the heater core. Thus, the above-described improvement in air conditioning performance cannot be expected.

In addition, if the blower fan is disposed downstream of the heater core, since the blower fan and the air outlet are usually close to each other, noise of the blower fan can easily reach the vehicle cabin and thus it is difficult to ensure quietness required as a vehicular air conditioner.

Furthermore, if the blower fan and the air outlet are close to each other, the airflow balance between an air blown out to the driver's seat and an air blown out to the passenger's seat due to a velocity component in the rotational direction of the airflow blown out from the blower fan.

An objective of the present disclosure is to provide a vehicular air conditioner that is capable of improving an air conditioning performance.

According to one aspect of the present disclosure, a vehicular air conditioner includes:

a casing that defines an air passage through which an air flows;

a blower fan that includes a plurality of blades arranged in a circumferential direction about a fan axis, the blower fan configured to generate an airflow in the air passage to be supplied to the vehicle cabin by rotating the plurality of blades about the fan axis; and a heating heat exchanger that is disposed in the casing to heat the air flowing through the air passage.

The air passage is divided into an outside air passage through which an outside air from an outside of the vehicle cabin flows and an inside air passage through which an inside air from the vehicle cabin circulates. The heating heat exchanger is disposed downstream of the blower fan in the casing, The outside air passage includes a first outside air space for guiding an outside air to the driver's seat in the vehicle cabin and a second outside air space for guiding an outside air to the passenger seat in the vehicle cabin. The inside air passage includes a first inside air space for guiding an inside air to the driver's seat in the vehicle cabin and a second inside air space for guiding an inside air to the passenger seat in the vehicle cabin.

The blower fan is disposed to extend across the first outside air space, the second outside air space, the first inside air space, and the second inside air space. Then, the blower fan rotates the blades in the rotational direction such that the blades pass through the first inside air space, the first outside air space, the second outside air space, and the second inside air space in this order.

Since the heating heat exchanger is arranged downstream of the blower fan, the heating heat exchanger serves as a sound insulator that inhibits noise of the blower fan from reaching the vehicle cabin. Therefore, the quietness of the vehicular air conditioner can be ensured.

In a layout in which the heating heat exchanger is disposed downstream of the blower fan, the heating heat exchanger serves as an airflow adjuster that adjusts a flow of an air blown from the blower fan. For this reason, it is possible to avoid deterioration of the airflow balance between the air blown out toward the driver's seat and the air blown out toward the passenger seat due to the influence by the speed component of the airflow in the rotation direction (that is, the rotational component) that is blown out from the blower fan.

Further, in a layout in which the heating heat exchanger is disposed downstream of the blower fan, it is possible to secure a temperature difference between the outside air and the inside air drawn into the blower fan. For this reason, in a situation in which a low-temperature outside air and a high-temperature inside air are introduced into the blower fan, it can be expected that the temperature of the air flowing through the outside air passage increases because of heat transfer between the inside-air passage and the outside-air passage which is generated due to the heat capacity of the blower fan. This contributes to an improvement in the anti-fog capability of the vehicular air conditioner.

In particular, in the vehicular air conditioner of the present disclosure, when the blower fan rotates, the blades pass through the first inside air space for guiding the inside air toward the driver's seat, the first outside air space for guiding the outside air toward the driver's seat, and the second inside air space for guiding the inside air toward the passenger seat, in this order. Accordingly, since the temperature of the outside air flowing through the first outside air space is increased by the blades which have received heat from, and been increased in temperature by, the inside air flowing through the first inside air space and the second inside air space, it is possible to improve the anti-fogging property for the area around the driver's seat in the vehicle cabin.

As described above, the vehicular air conditioner of the present disclosure can improve the air conditioning performance such as anti-fogging function, quietness, and airflow adjustment.

First Embodiment

The present embodiment will be described with reference to FIGS. 1 to 9. A vehicular air conditioner 1 of the present embodiment includes an interior air-conditioning unit 10 and an air-conditioning controller 100. The interior air-conditioning unit 10 conditions a vehicle cabin by blowing air adjusted to have a desired temperature into the vehicle cabin.

Figure 2:
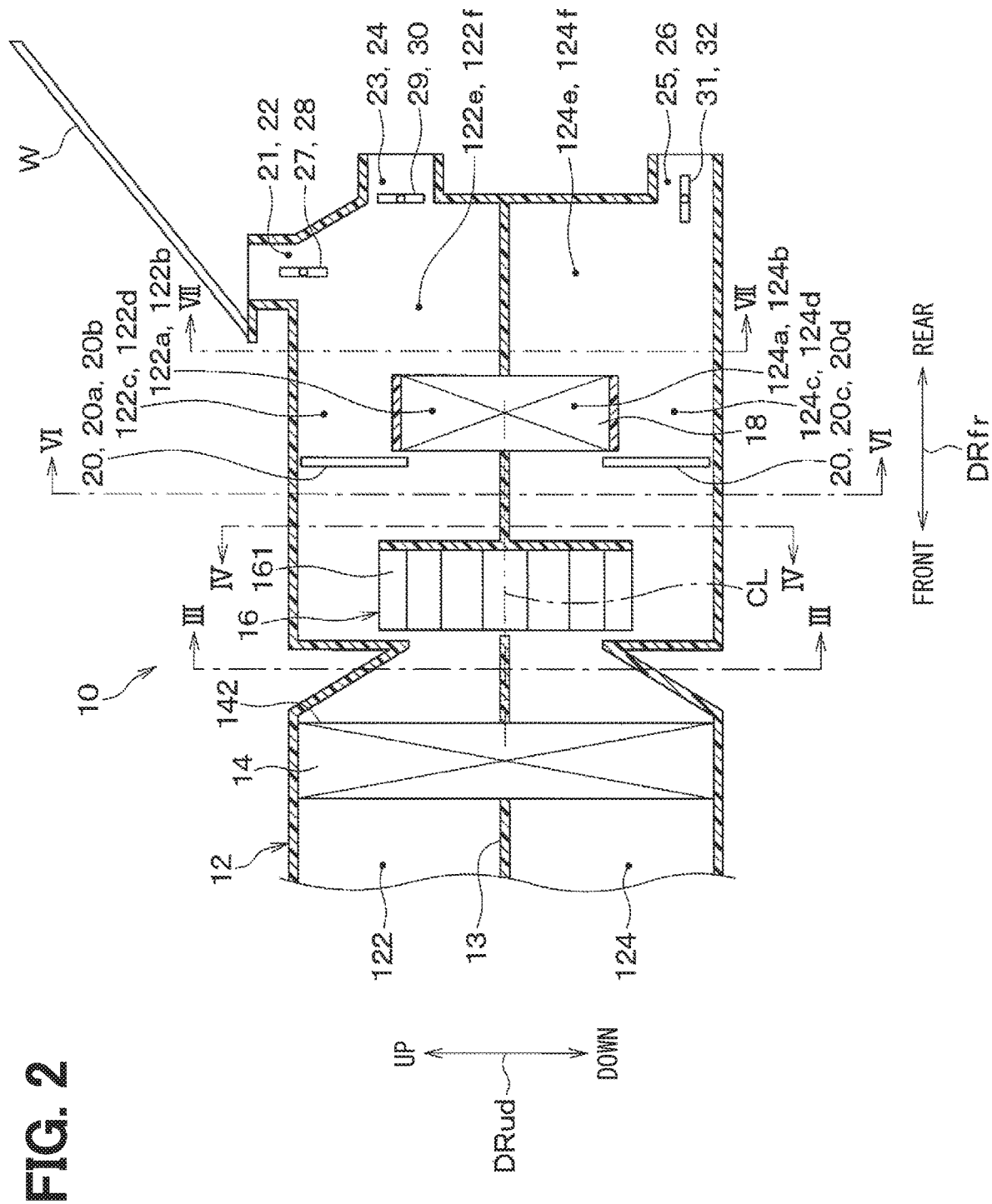
FIG. 2 is a cross-sectional view schematically illustrating the vehicular air conditioner according to a first embodiment.

In the present embodiment, an arrow DRfr indicating the front and rear sides as shown in FIG. 1 indicates a front-rear direction of the vehicle, and an arrow DRw indicating the left and right sides as shown in FIG. 1 indicates a right-left direction of the vehicle (i.e., the vehicle width). Also, an arrow DRud indicating the up and down sides as shown in FIG. 2 indicates an up-down direction of the vehicle.

As shown in FIG. 1, the interior air conditioning unit 10 is disposed inside an instrument panel IP at the front of the vehicle cabin. The interior air-conditioning unit 10 adjusts a temperature of an air blown out from air outlets 80 formed on the surface of the instrument panel IP.

The air outlet 80 of the present embodiment includes a defroster outlet 81, driver face outlets 82, passenger face outlets 83, a driver foot outlet 84, a passenger foot outlet 85, and the like.

The defroster outlet 81 is an outlet for blowing air having a low relative humidity toward a window glass W of the vehicle. The defroster outlet 81 is open on the surface of the instrument panel IP near the window glass W of the vehicle.

The driver face outlet 82 is an outlet for blowing a conditioned air toward an upper body of a driver seated on the driver seat DrS. The passenger face outlet 83 is an outlet for blowing a conditioned air toward an upper body of a passenger seated on the passenger seat PaS. Each of the driver face outlet 82 and the passenger face outlet 83 is open on the surface of the instrument panel IP.

The driver foot outlet 84 is an outlet for blowing a conditioned air toward an lower body of a driver seated on the driver seat DrS. The passenger foot outlet 85 is an outlet for blowing a conditioned air toward an lower body of a passenger seated on the passenger seat PaS. Each of the driver foot outlet 84 and the passenger foot outlet 85 are open inside the instrument panel IP.

In the interior air-conditioning unit 10 of the present embodiment, the temperature of the air blown into a space around the driver seat DrS and the air blown into a space around the passenger seat PaS of the vehicle cabin can be independently adjusted. As shown in FIG. 2, the interior air conditioning unit 10 includes a casing 12, an evaporator 14, a blower fan 16, a heater core 18, an air mixing door 22, and the like.

The casing 12 defines an air passage through which an air to be supplied to the vehicle cabin flows. The casing 12 is made from material having a certain degree of elasticity and high strength (e.g., polypropylene).

Although not shown, an outside-air port for introducing an outside air from an outside of the vehicle cabin and an inside-air port for introducing an inside air from the vehicle cabin are formed at the most upstream side of the casing 12. The outside-air port introduces an outside air into the casing 12. The inside-air port introduces an inside air into the casing 12. The opening areas of the outside-air port and the inside-air port are continuously adjusted by an inside/outside air switching door (not shown). The inside/outside air switching door serves as an airflow ratio adjusting means that continuously changes the airflow ratio between the inside air and the outside air.

An air passage formed inside the casing 12 is divided by an upper/lower partition wall 13 into an outside air passage 122 through which an outside air introduced from the outside of the vehicle cabin flows and an inside air passage 124 through which an inside air introduced from an inside of the vehicle cabin flows. The upper/lower partition wall 13 is set in the casing 12 so that the outside air passage 122 is located above the inside air passage 124.

The evaporator 14 is disposed downstream of the outside air introduction port and the inside air introduction port in the casing 12. The evaporator 14 serves as a cooling heat exchanger that cools the air introduced into the casing 12. The evaporator 14 constitutes a vapor compression-type refrigeration cycle system together with a compressor, a radiator, an expansion valve, and the like (not shown). The evaporator 14 cools the air introduced into the casing 12 by exchanging heat between a low-pressure refrigerant flowing through the cycle and the air introduced into the casing 12.

The evaporator 14 of the present embodiment is disposed so as to cross the entire area of both the outside air passage 122 and the inside air passage 124. Thus, all the air flowing through the outside air passage 122 and the inside air passage 124 passes through the evaporator 14.

The blower fan 16 is disposed downstream of the evaporator 14 in the casing 12. The blower fan 16 generates an airflow in the air passage of the casing 12 toward the vehicle cabin. The blower fan 16 is driven to rotate by an electric motor (not shown).

The blower fan 16 includes a plurality of blades 161 arranged in a circumferential direction about a fan axis CL. The blower fan 16 is configured to generate an airflow in the air passage of the casing 12 to be supplied to the vehicle cabin by rotating the plurality of blades 161 about the fan axis CL.

The blower fan 16 of the present embodiment is a turbo fan which is one type of centrifugal fans. The blower fan 16 of the present embodiment blows out air taken in along the fan axis CL in a radially outside direction of the blower fan 16 which is orthogonal to the fan axis CL. The plurality of blades 161 of the blower fan 16 are formed of resin and are integrally formed with a fan main plate and a fan side plate (both of which are not shown).

Figure 3:
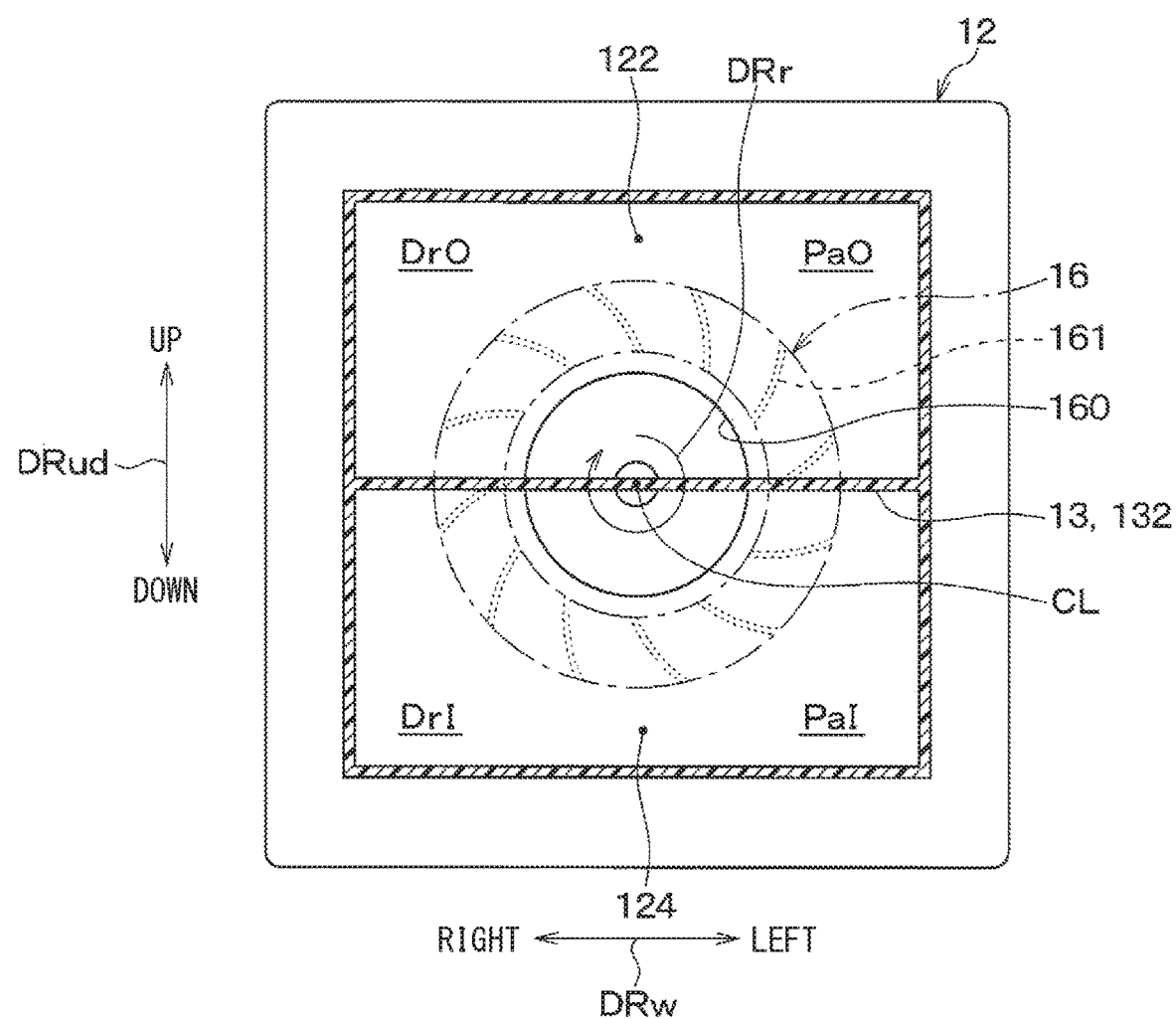
FIG. 3 is a cross-sectional view taken along III-III line in FIG. 2.

Further, the blower fan 16 of the present embodiment is oriented such that the fan axis CL extends along the front-rear direction DRfr of the vehicle. Moreover, the blower fan 16 is disposed such that the air suction side of the blower fan 16 faces an air exiting surface 142 of the evaporator 14. More specifically, the blower fan 16 is arranged so that the fan axis CL1 is substantially orthogonal to the air exiting surface 142 of the evaporator 14. As shown in FIG. 3, an inlet-side partition 132 that partitions the outside air passage 122 from the inside air passage 124 is provided. The inlet-side partition 132 is formed into a flat shape extending in the radial direction of the blower fan 16 and crossing an air inlet 160 of the blower fan 16. The inlet-side partition 132 is fixed to an inner wall surface of the casing 12.

The outside air passage 122 and the inside air passage 124 are defined by the inlet-side partition 132 at a position upstream of the blower fan 16. As a result, an outside air flowing through the outside air passage 122 and an inside air flowing through the inside air passage 124 are separately taken into the blower fan 16.

Figure 4:
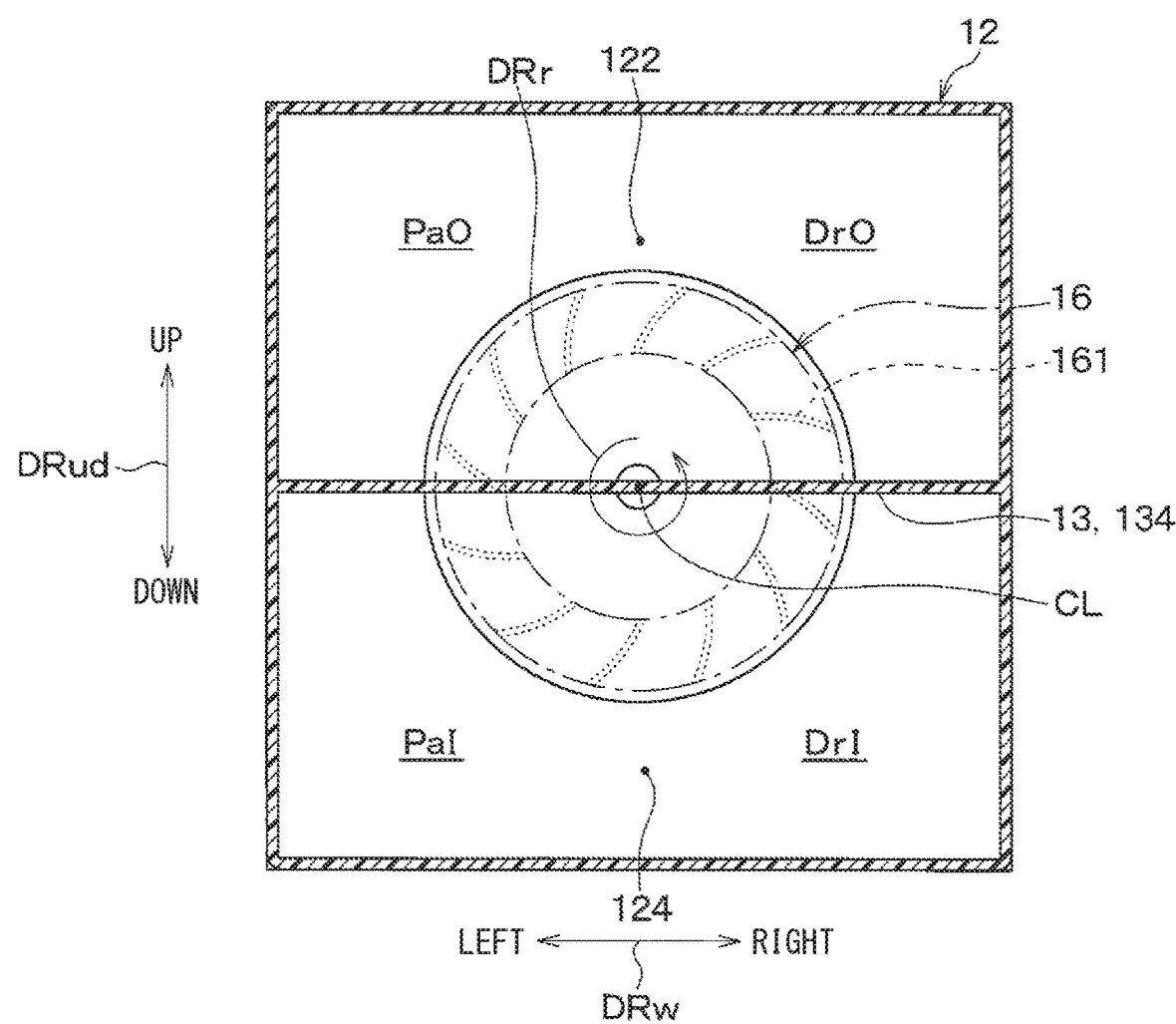
FIG. 4 is a cross-sectional view taken along IV-IV line of FIG. 2.

As shown in FIG. 4, an inlet-side partition 134 that partitions the outside air passage 122 from the inside air passage 124 is disposed downstream of the blower fan 16. The outlet-side partition 134 is formed into a flat shape extending in the radial direction of the blower fan 16 and crossing a bottom side of the blower fan 16. The outlet-side partition 134 is fixed to an inner wall surface of the casing 12. The outlet-side partition 134 of the present embodiment is located at the same position as the inlet-side partition 132 in the rotational direction DRr of the blower fan 16.

The outside air passage 122 and the inside air passage 124 are defined by the outlet-side partition 134 at a position downstream of the blower fan 16. As a result, an outside air and an inside air can be separately blown out into the outside air passage 122 and the inside air passage 124, respectively, by the blower fan 16.

Here, in the outside air passage 122, a space including the driver's seat DrS (for example, the right side in this example) in the vehicle left-right direction DRw serves as a first outside air space DrO for guiding an outside air to the driver's seat DrS in the vehicle cabin. Here, in the outside air passage 122, a space including the passenger's seat PaS (for example, the left side in this example) in the vehicle left-right direction DRw serves as a second outside air space PaO for guiding an outside air to the passenger's seat PaS in the vehicle cabin.

As described above, the outside air passage 122 of the present embodiment includes the first outside air space DrO for guiding an outside air to the driver's seat DrS in the vehicle cabin and the second outside air space PaO for guiding an outside air to the passenger seat PaS in the vehicle cabin. The first outside air space DrO and the second outside air space PaO are not partitioned from each other, and therefore the outside air flowing through the space DrO and the outside air flowing through the space PaO may be mixed with each other.

On the contrary, in the inside air passage 124, a space including the driver's seat DrS (for example, the right side in this example) in the vehicle left-right direction DRw serves as a first inside air space DrI for guiding an inside air to the driver's seat DrS in the vehicle cabin. Specifically, the first inside air space DrI is located below the first outside air space DrO in the vehicle up-down direction DRud.

Further, in the inside air passage 124, a space including the passenger's seat PaS (for example, the left side in this example) in the vehicle left-right direction DRw serves as a second inside air space PaI for guiding an inside air to the passenger's seat PaS in the vehicle cabin. Specifically, the second inside air space PaI is located below the second outside air space PaO in the vehicle up-down direction DRud.

In this way, the inside air passage 124 of the present embodiment includes the first inside air space DrI for guiding an inside air to the driver's seat DrS in the vehicle cabin and the second inside air space PaI for guiding an inside air to the passenger seat PaS in the vehicle cabin. The first inside air space DrI and the second inside air space PaI are not partitioned from each other, and therefore the inside air flowing through the space DrI and the inside air flowing through the space PaI may be mixed with each other.

The blower fan 16 of the present embodiment is disposed to extend across the first outside air space DrO, the second outside air space PaO, the first inside air space DrI, and the second inside air space PaI. Then, the blower fan 16 of the present embodiment rotates in the rotational direction such that the blades 161 pass through the first inside air space DrI, the first outside air space DrO, the second outside air space PaO, and the second inside air space PaI in this order. It is assumed that one of the blades 161 of the blower fan 16 is identified as a specific blade. Then, the specific blade of the blower fan 16 passes through the first inside air space DrI→the first outside air space DrO→the second outside air space PaO→the second inside air space PaI→the first inside air space DrI.

Returning to FIG. 2, a heater core 18 is disposed downstream of the blower fan 16 in the casing 12. The heater core 18 serves as a heating heat exchanger for heating air flowing through the air passage in the casing 12. The heater core 18 heats an air introduced into the casing 12 by exchanging heat between a cooling water for cooling the engine and an air blown by the blower fan 16. The heater core 18 of the present embodiment is located at a substantially center position of the casing 12 in the up-down direction DRud to cross parts of the outside air passage 122 and the inside air passage 124.

Figure 5:
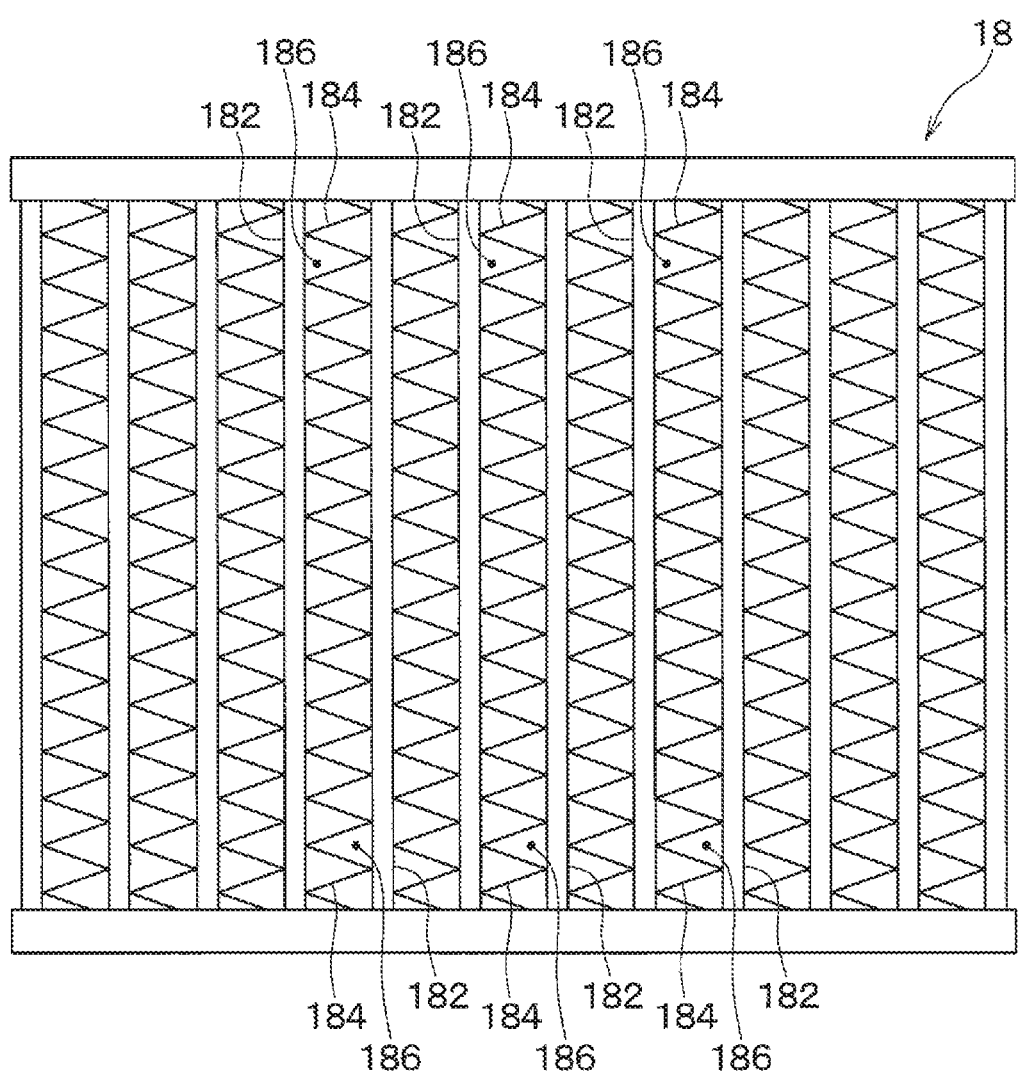
FIG. 5 is a schematic diagram illustrating a schematic configuration of a heater core.

As shown in FIG. 5, the heater core 18 of the present embodiment includes a plurality of tubes 182 through which engine cooling water as a heating medium for heating air flows and a plurality of heat exchange fins 184 each of which is arranged between the adjacent two tubes 182. The plurality of tubes 182 and the plurality of heat exchange fins 184 are alternately stacked with each other to constitute a stacked body. With such a stacked body, a plurality of heat exchange channels 186 that pass through the heater core 18 in an extending direction of the fan axis CL are formed in the heater core 18.

Therefore, in the heater core 18, the air blown from the blower fan 16 passes through the plurality of heat exchange channels 186 that pass through the heater core 18 in the extending direction of the fan axis CL. At this time, since each of the plurality of heat exchange channels 186 passes through the heater core 18 in the extending direction of the fan axis CL and is subdivided, the air that is blown from the blower fan 16 and has a velocity component in the rotation direction DRr (that is, the rotational component) is adjusted to flow in a direction along the fan axis CL. That is, the heater core 18 serves as an airflow adjuster that reduces a velocity component in the rotation direction DRr of the air that is blown from the blower fan 16. In addition, a noise due to rotation of the blower fan 16 is attenuated when the air is passing through each of the plurality of heat exchange channels 186. In the present embodiment, the plurality of tubes 182 constitute a medium circulation portion that is a flow path of the heating medium, and the plurality of heat exchange fins 184 constitute a heat transfer promoting portion that promotes heat exchange between the air and the heating medium.

Returning to FIG. 2, outside air bypass passages 122c and 122d are formed above the heater core 18 in the casing 12 to have an air bypass the heater core 18. The outside air bypass passages 122c and 122d constitute the outside air passage 122 at an upper side of the casing 12 together with outside air heating passages 122a and 122b in which the heater core 18 is disposed.

The outside air bypass passages 122c and 122d and the outside air heating passages 122a and 122b are divided by a left-right partition 19 into a passage for guiding air to the driver seat DrS and a passage for guiding air to the passenger seat PaS, respectively.

Further, inside air bypass passages 124c and 124d are formed below the heater core 18 in the casing 12 to have an air bypass the heater core 18. The inside air bypass passages 124c and 124d constitute the inside air passage 124, at a lower side of the casing 12, together with inside air heating passages 124a and 124b in which the heater core 18 is disposed.

The inside air bypass passages 124c and 124d and the inside air heating passages 124a and 124b are divided by the left-right partition 19 into a passage for guiding air to the driver seat DrS and a passage for guiding air to the passenger seat PaS, respectively.

An air mix door 20 are arranged between the blower fan 16 and the heater core 18. The air mix door 20 serves as a temperature adjuster that adjusts the temperature of the air blown into the vehicle cabin by adjusting the ratio of the flow rate of an air flowing into the heater core 18 and the flow rate of an air bypassing the heater core 18. The air mix door 20 of the present embodiment is a slide door that slides in a direction intersecting the airflow direction. Note that the air mix door 20 may be a rotational door that rotates about a rotational axis.

Figure 6:
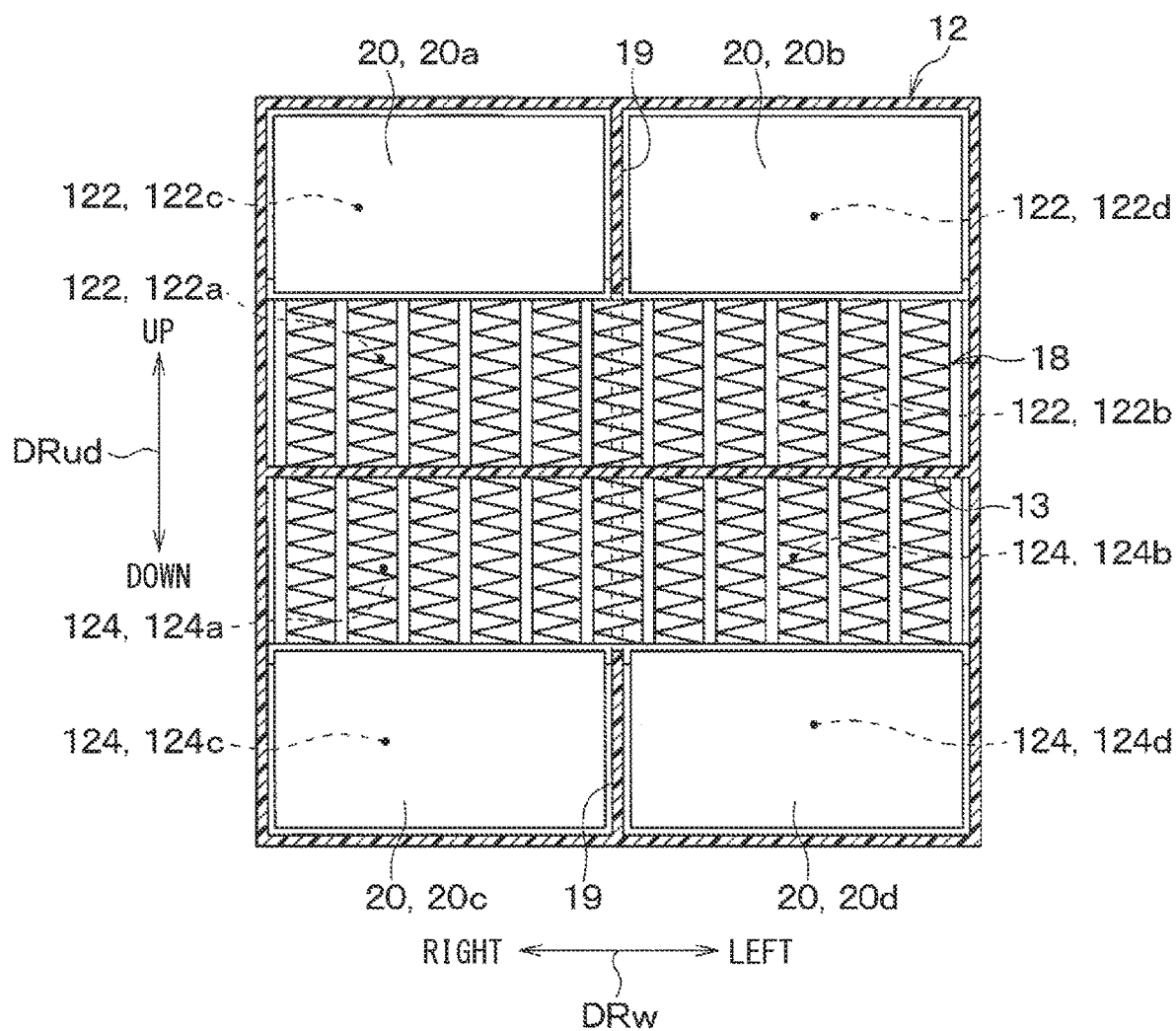
FIG. 6 is a cross-sectional view taken along VI-VI line of FIG. 2.

As shown in FIG. 6, the air mix door 20 includes a pair of outside temperature control doors 20a and 20b disposed in the outside air passage 122 and a pair of inside temperature control doors 20c and 20d disposed in the inside air passage 124.

The pair of outside temperature control doors 20a and 20b are doors that adjust a ratio of the flow rate of an air flowing into the outside air heating passages 122a and 122b and the flow rate of an air flowing into the outside air bypass passages 122c and 122d. The pair of outside temperature control doors 20a and 20b are independently driven by an output from an actuator (not shown).

The pair of inside temperature control doors 20c and 20d are doors that adjust a ratio of the flow rate of an air flowing into the inside air heating passages 124a and 124b and the flow rate of an air flowing into the inside air bypass passages 124c and 124d. The pair of inside temperature control doors 20c and 20d are independently driven by an output from an actuator (not shown).

Figure 7:
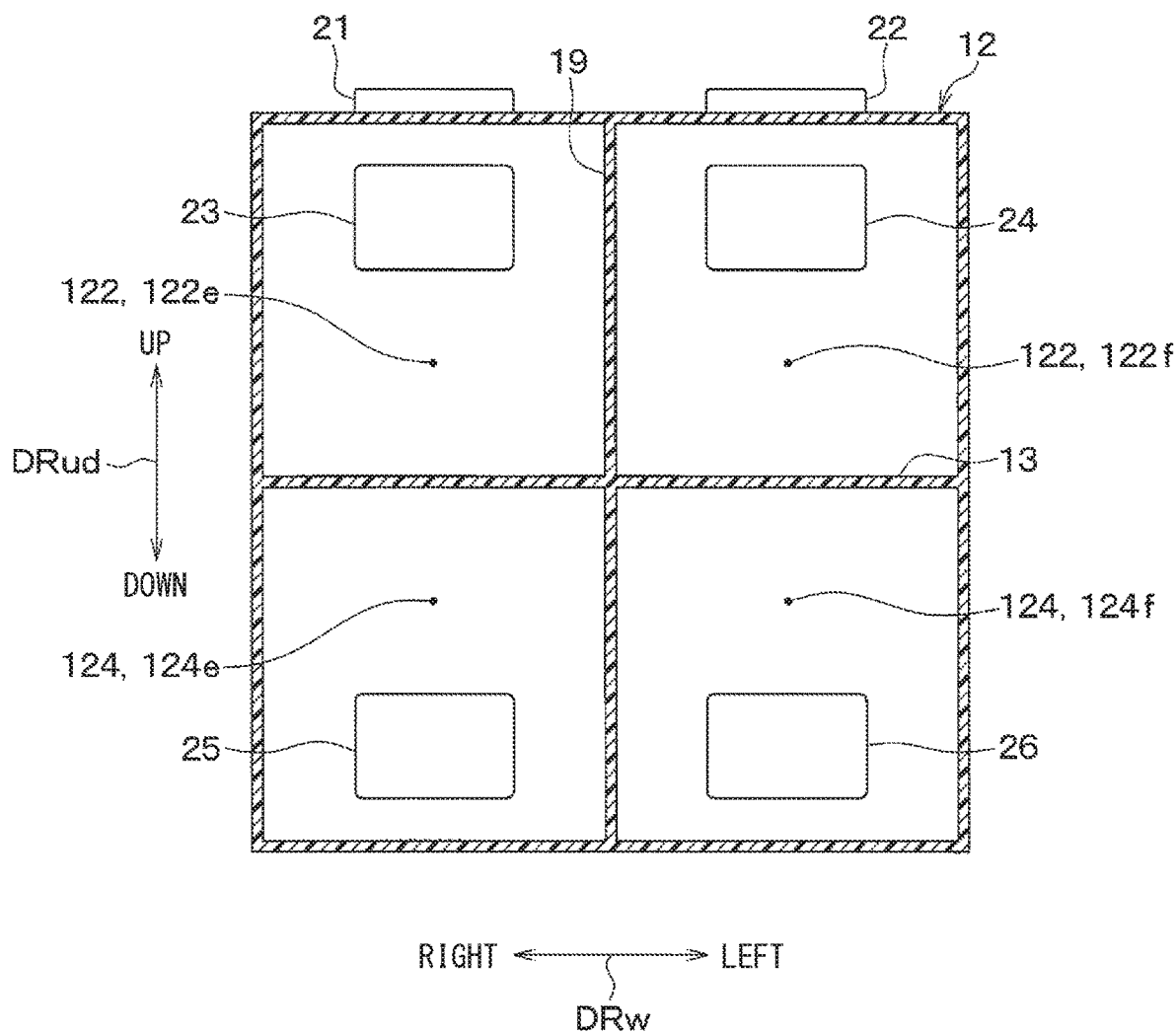
FIG. 7 is a cross-sectional view taken along VII-VII line of FIG. 2.

Returning to FIG. 2, a plurality of blowout openings for blowing a temperature-adjusted air in the casing 12 to the vehicle cabin are formed at the most downstream side of the casing 12. As shown in FIG. 7, the casing 12 includes a driver-side defroster opening 21, a passenger-side defroster opening 22, a driver-side face opening 23, a passenger-side face opening 24, and a driver-side foot opening. 25, a passenger seat side foot opening 26 and the like is formed. Mode switching doors 27 to 32 for selectively opening and closing the corresponding openings 21 to 26 to change an air blowing mode are disposed upstream of the corresponding openings 21 to 26 in the air flow.

Each of the driver-side defroster opening 21 and the passenger-side defroster opening 22 are in communication with the defroster outlet 81 through a duct (not shown). The driver-side seat face opening 23 is in communication with the driver face outlet 82 through a duct (not shown). The passenger-side face opening 24 is in communication with the passenger face outlet 83 through a duct (not shown). The driver-side foot opening 25 is in communication with the driver foot outlet 84 through a duct (not shown). The passenger-side foot opening 26 is in communication with the passenger foot outlet 85 through a duct (not shown).

The outside air passage 122 is divided into a driver-side outside air passage 122e and a passenger-side outside air passage 122f by the upper/lower partition wall 13 and the left and right partition wall 19 at the most downstream side of the casing 12. The inside air passage 124 is divided into a driver-side inside air passage 124e and a passenger-side inside air passage 124f by the upper/lower partition wall 13 and the left and right partition wall 19 at the most downstream side of the casing 12.

The driver-side defroster opening 21 and the driver-side face opening 23 are formed in a portion of the outside air passage 122 that defines the driver-side outside air passage 122e. The driver-side foot opening 25 is formed in a portion of the inside air passage 124 that defines the driver-side inside air passage 124e.

The passenger-side defroster opening 22 and the passenger-side face opening 24 are formed in a portion of the outside air passage 122 that defines the passenger-side outside air passage 122f. The passenger-side foot opening 26 is formed in a portion of the inside air passage 124 that defines the passenger-side inside air passage 124f.

The air-conditioning controller 100 is formed of at least one processor, at least one memory, and peripheral circuits. The air-conditioning controller 100 performs various calculations and processes based on control programs stored in the memory and controls the operation of various devices connected to the controller 100. The memory of the air-conditioning device 100 is a non-transitory tangible storage medium.

Although not illustrated, the air-conditioning controller 100 is connected to a group of various sensors for air-conditioning. The group of various sensors for air-conditioning includes, for example, an inside air temperature sensor, an outside air temperature sensor, a solar radiation sensor, an evaporator temperature sensor for detecting the temperature of air blown out from the evaporator 14, a humidity sensor for detecting a humidity in the vehicle cabin, and the like.

Although not shown, an air-conditioning operation panel is connected to an input side of the air-conditioning controller 100. Operation signals output from various operation switches of the air-conditioning operation panel are input to the air-conditioning controller 100. The air-conditioning operation panel is disposed near the instrument panel IP. The various operation switches include, for example, an operation switch for the vehicular air conditioner 1, an operation mode change switch, and a temperature setting switch for setting a target temperature in the vehicle cabin.

The air-conditioning controller 100 integrally includes software and hardware, as air-conditioning control means, that is connected to its output side for controlling various control devices. In the air-conditioning controller 100, a part of the control devices connected to the output side may be configured as a separate control means.

Figure 8:
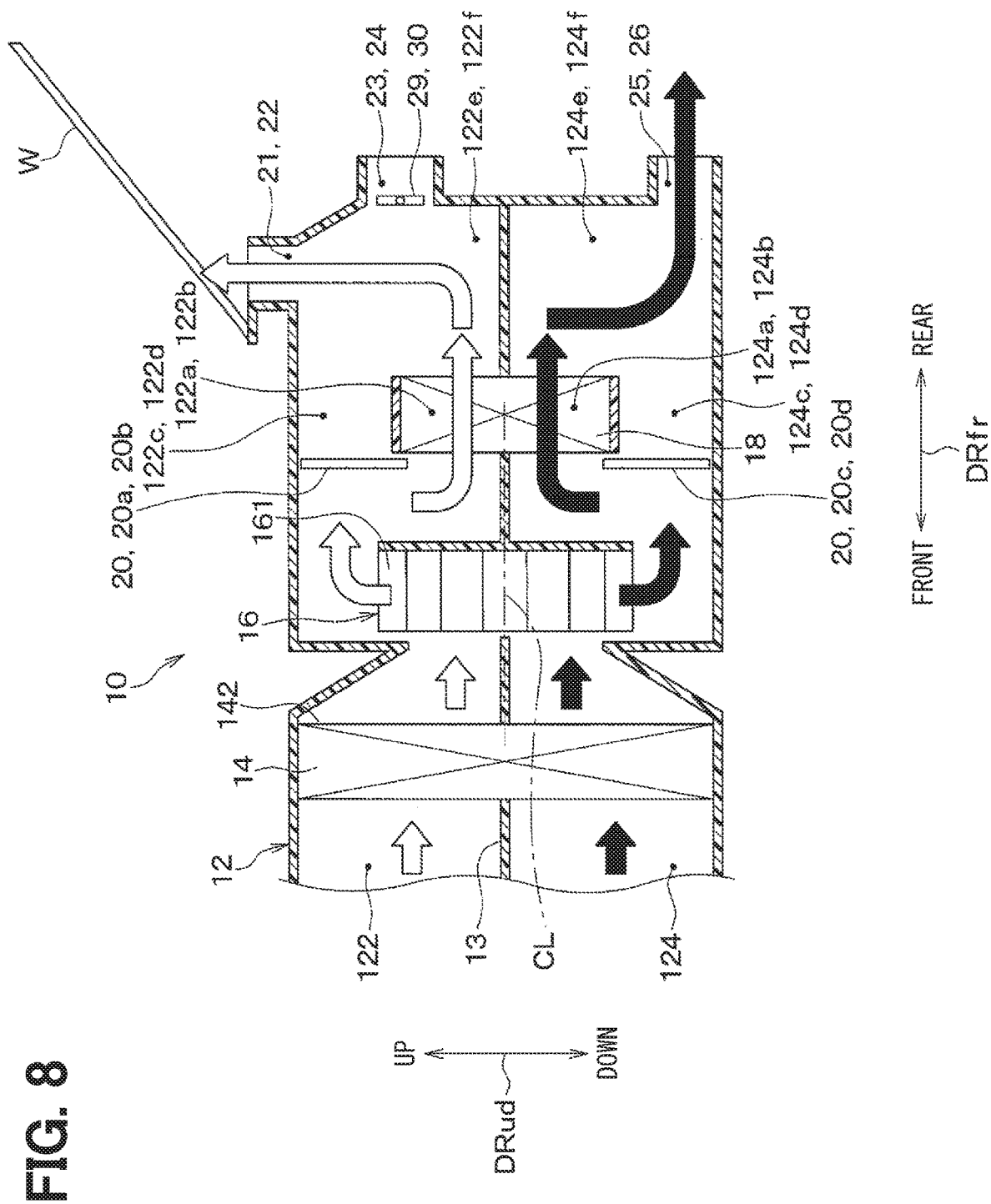
FIG. 8 is an explanatory diagram for describing a flow of an air during an inside/outside air two-layer mode of the vehicular air conditioner according to the first embodiment.

Next, an operation of the vehicular air conditioner 1 of the present embodiment will be described with reference to FIGS. 8 and 9. FIG. 8 shows the flow of air in the casing 12 during an inside/outside air two-layer mode. During the inside/outside air two-layer mode, an outside air having a lower relative humidity than an inside air is blown toward the window glass W of the vehicle to prevent fogging of the window, and an inside air having a higher temperature than the outside air circulates in the vehicle cabin to increase the heating efficiency.

In the inside/outside air two-layer mode, the air mixing door 20 is controlled to move to a position to close the outside air bypass passages 122c and 122d and the inside air bypass passages 124c and 124d. In the inside/outside air two-layer mode, the mode switching doors 27 to 32 are controlled to move to positions where the defroster openings 21 and 22 and the foot openings 25 and 26 are opened.

In this state, when the blower fan 16 is rotated by the air-conditioning controller 100, an outside air and an inside air are introduced into the casing 12, as shown in FIG. 8. In FIG. 8, the white arrows indicate the flow of the outside air, and the black arrows indicate the flow of the inside air.

The outside air and inside air introduced into the casing 12 flow into the evaporator 14 via the outside air passage 122 and the inside air passage 124, and then are dehumidified there. Then, the outside air and the inside air that have passed through the evaporator 14 are drawn into the blower fan 16 and are discharged radially outward in the radial direction of the fan.

At this time, a low-temperature outside air and a high-temperature inside air are drawn into the blower fan 16. Therefore, heat transfer occurs between the outside air passage 122 and the inside air passage 124 due to the heat capacity of the blower fan 16, and as a result the temperature of the outside air flowing through the outside air passage 122 increases.

Figure 9:
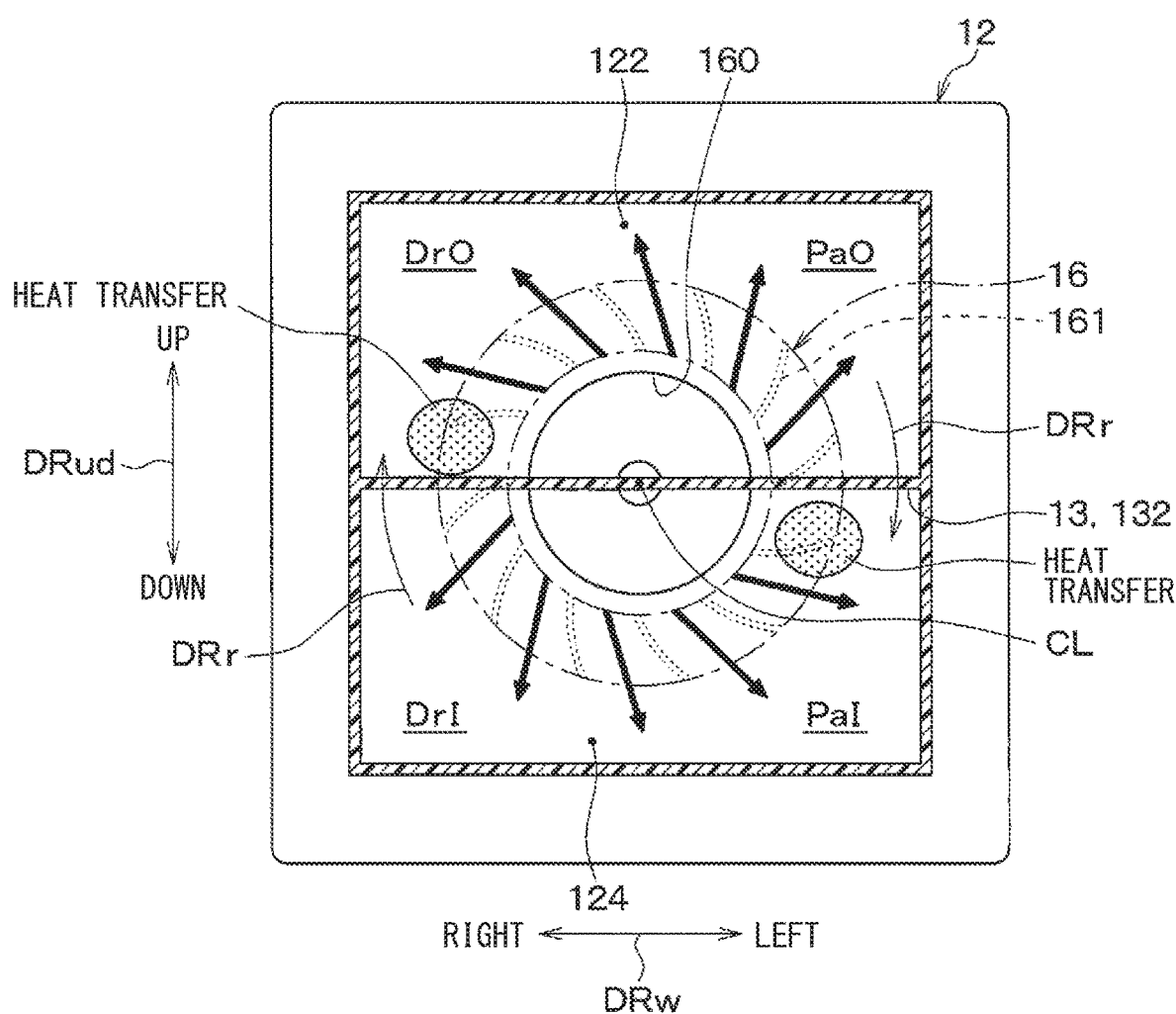
FIG. 9 is an explanatory diagram for describing a flow of an air in the blower fan during the inside/outside air two-layer mode of the vehicular air conditioner according to the first embodiment.

More specifically, since the blades 161 of the blower fan 16 have heat capacity, the blades 161 increases in temperature by receiving heat from the inside air when passing through the second inside air space PaI and the first inside air space DrI, as shown in FIG. 9. Then, when the heated blades 161 enters the first outside air space DrO, the heat of the blades 161 is transferred to the outside air. As a result, the temperature of the outside air flowing through the first outside air space DrO increases.

On the other hand, when the blades 161 of the blower fan 16 pass through the second outside air space PaO, they transfer heat to the outside air and decrease in temperature. Then, when the cooled blades 161 enter the second inside air space PaI again, the temperature of the inside air flowing through the second inside air space PaI is decreased by the cooled blades 161.

The outside air blown from the blower fan 16 flows into the heater core 18 and is heated to a desired temperature, and then is blown toward the window glass W of the vehicle through the defroster openings 21 and 22 and the defroster outlet 81 and the like. The inside air blown from the blower fan 16 flows into the heater core 18 and is heated to a desired temperature, and then is blown toward a lower body of a passenger through the foot openings 25 and 26 and the foot outlets 84 and 85.

In the vehicular air conditioner 1 of the present embodiment described above, the heater core 18, which is a heating heat exchange, is disposed downstream of the blower fan 16. Accordingly, the heater core 18 serves as a sound insulator that inhibits noise of the blower fan 16 from transferring to the vehicle cabin, and thus quietness of the vehicular air conditioner 1 can be ensured.

In a layout in which the heater core 18 is disposed downstream of the blower fan 16, the heater core 18 serves as an airflow adjuster that adjusts a flow of an air blown from the blower fan 16. For this reason, it is possible to avoid deterioration of the airflow balance between the air blown out toward the driver's seat DrS and the air blown out toward the passenger seat PaS due to the influence by the speed component of the airflow in the rotation direction DRr (that is, the rotational component) that is blown out from the blower fan 16.

Further, in a layout in which the heater core 18 is disposed downstream of the blower fan 16, it is possible to secure a temperature difference between the outside air and the inside air drawn into the blower fan 16. For this reason, in a situation in which a low-temperature outside air and a high-temperature inside air are introduced into the blower fan 16 as with the inside-outside air two-layer mode, it can be expected that the temperature of the outside air increases because of heat transfer between the inside-air passage 124 and the outside-air passage 122 which is generated due to the heat capacity of the blower fan 16. This contributes to an improvement in the anti-fog capability of the vehicular air conditioner 1.

In particular, in the vehicular air conditioner 1 of the present embodiment, when the blower fan 16 rotates, the blades 161 pass through the first inside air space DrI, the first outside air space DrO, the second outside air space PaO, and the second inside air space PaI in this order. Accordingly, since the temperature of the outside air flowing through the first outside air space DrO is increased by the blades 161 which have received heat from, and been increased in temperature by, the inside air flowing through the first inside air space DrI and the second inside air space PaI, it is possible to improve the anti-fogging property for the area around the driver's seat DrS in the vehicle cabin.

Here, in the vehicular air conditioner 1 of the present embodiment, there is a concern that the temperature of the air blown out to a lower body of a passenger on the passenger seat PaS may decrease during the inside/outside air two-layer mode. For this reason, the vehicular air conditioner 1 of the present embodiment is suitable for a vehicle in which an passenger often sits only the driver's seat DrS.

Further, in the vehicular air conditioner 1 of the present embodiment, the heater core 18 serves as an airflow adjuster for adjusting a flow of an air blown from the blower fan 16. For this reason, it is possible to sufficiently suppress deterioration of the airflow balance between the air blown out toward the driver's seat DrS and the air blown out toward the passenger seat PaS due to the influence by the rotational component of the airflow blown out from the blower fan 16.

Second Embodiment

Figure 10:
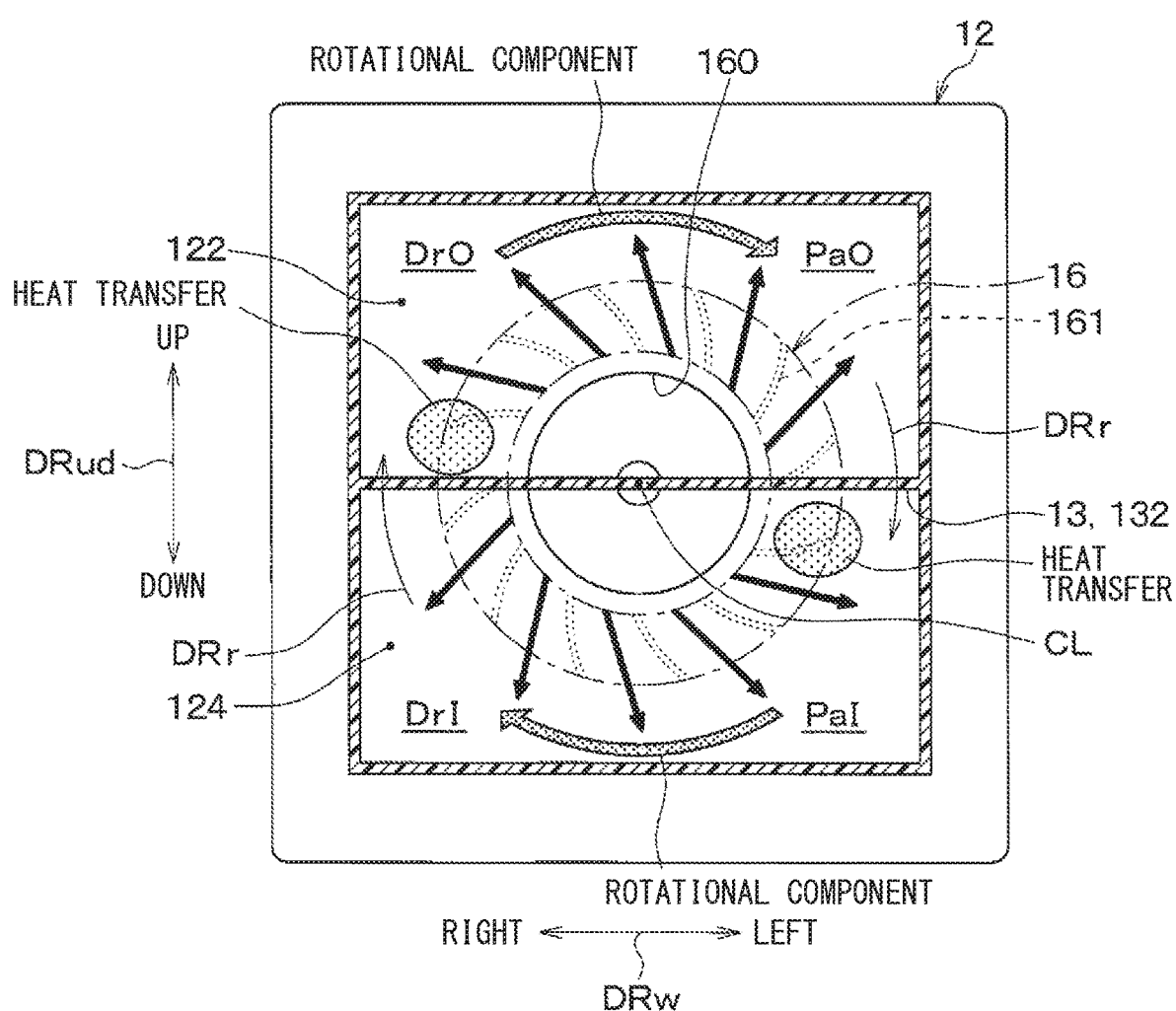
FIG. 10 is an explanatory diagram for describing a flow of an air in the blower fan during the inside/outside air two-layer mode of the vehicular air conditioner.

Next, a second embodiment will be described with reference to FIGS. 10 to 12. In the vehicular air conditioner 1 of the above-described first embodiment, the airflow blown from the blower fan 16 includes a velocity component in the rotation direction DRr (that is, a rotational component), as shown in FIG. 10. Therefore, due to the influence of the rotational component, the outside air in the first outside air space DrO tends to flow toward the second outside air space PaO and the inside air in the second inside air space PaI tends to flow toward the first inside air space DrI. This is not preferable for the vehicle air conditioner 1, because it may cause a deterioration in the airflow balance between the air blown to the driver seat DrS and the air blown to the passenger seat PaS.

Figure 11:
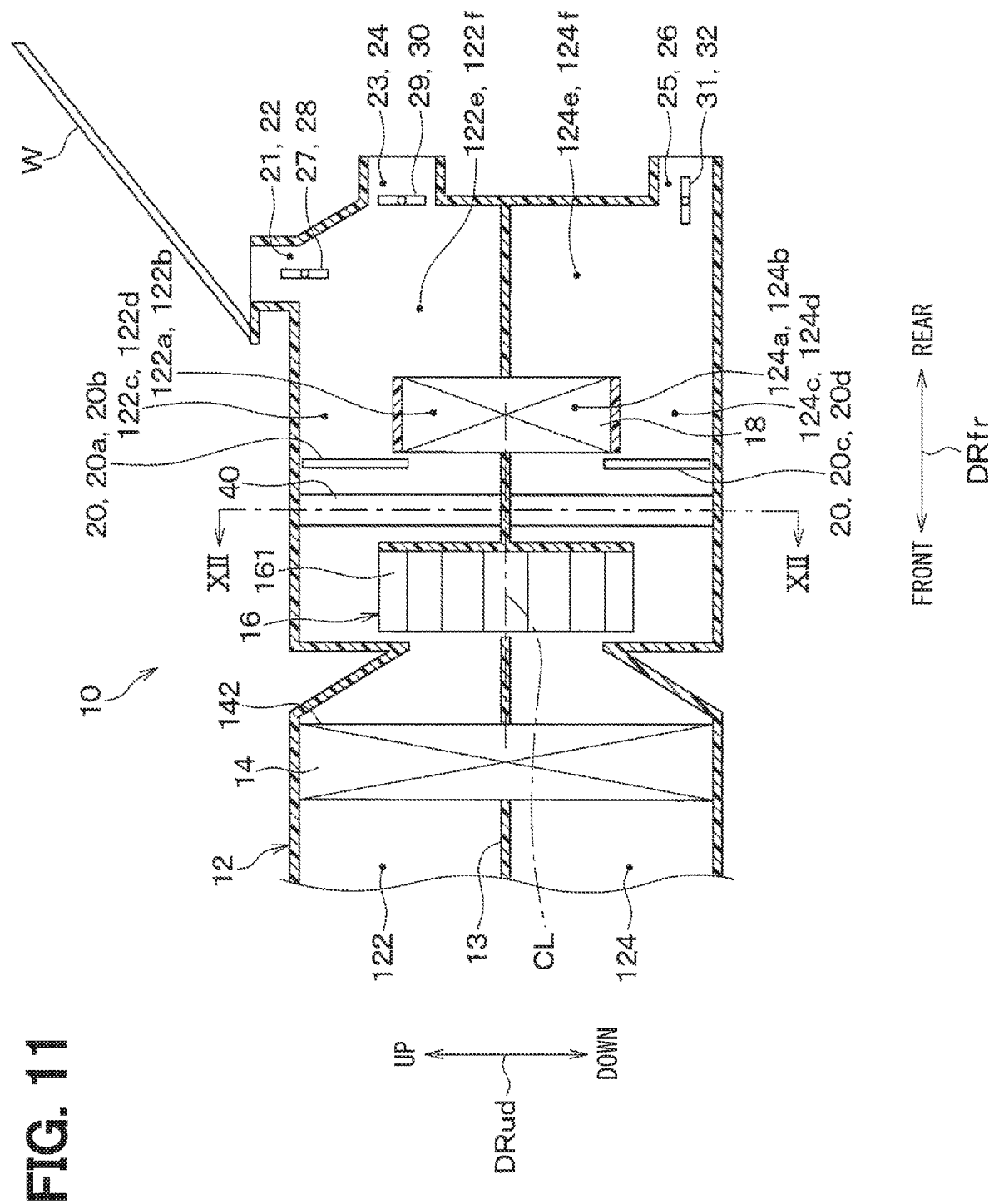
FIG. 11 is a cross-sectional view schematically illustrating a vehicular air conditioner according to a second embodiment.

Therefore, in the vehicular air conditioner 1 according to the present embodiment, an airflow adjuster 40 is disposed to control the rotational component of an airflow blown out from the blower fan 16, as shown in FIG. 11. That is, the airflow adjuster 40 has a function to reduce a velocity component in the rotation direction DRr of the air that is blown from the blower fan 16.

The airflow adjuster 40 of the present embodiment is disposed between the blower fan 16 and the heater core 18. Specifically, the airflow adjuster 40 is disposed at a position downstream of the blower fan 16 and upstream of the air mix door 20. The airflow adjuster 40 is disposed to extend over the entire area of both the outside air passage 122 and the inside air passage 124 that are downstream of the blower fan 16.

Figure 12:
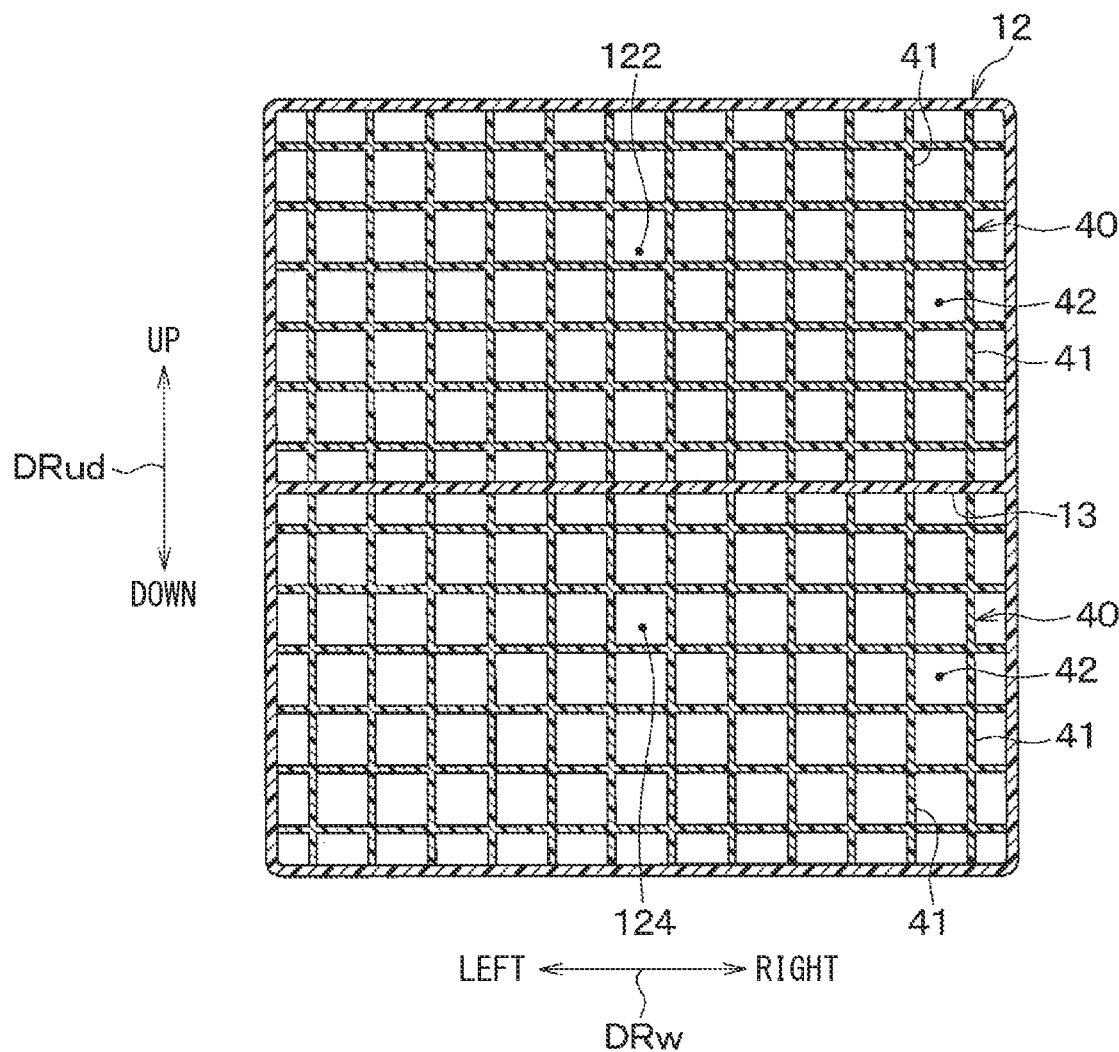
FIG. 12 is a cross-sectional view taken along line XII-XII in FIG. 11.

As shown in FIG. 12, the airflow adjuster 40 of the present embodiment includes a plurality of adjusting plates 41 that are connected to each other so that the plurality of adjusting plates 41 is formed into a rectangular grid shape as a whole. In the airflow adjuster 40, a plurality of adjusting channels 42 are formed between the plurality of adjusting plates 41 that pass through the airflow adjuster 40 in the extending direction of the fan axis CL.

In the airflow adjuster 40, an air blown from the blower fan 16 flows through the plurality of adjusting channels 42 that pass through the airflow adjuster 40 in the extending direction of the fan axis CL. At this time, since each of the plurality of adjusting channels passes through the airflow adjuster 40 in the extending direction of the fan axis CL and is subdivided, the air that is blown from the blower fan 16 and that has a rotational component in its velocity is adjusted to flow toward the vehicle cabin.

The other configurations are the same as those of the first embodiment. In the vehicular air conditioner 1 of the present embodiment, the airflow adjuster 40 is disposed downstream of the blower fan 16. Accordingly, it is possible to avoid deterioration of the airflow balance between the air blown out toward the driver's seat DrS and the air blown out toward the passenger seat PaS due to the influence by the speed component of the airflow in the rotation direction DRr that is blown out from the blower fan 16.

Modification to the Second Embodiment

Figure 13:
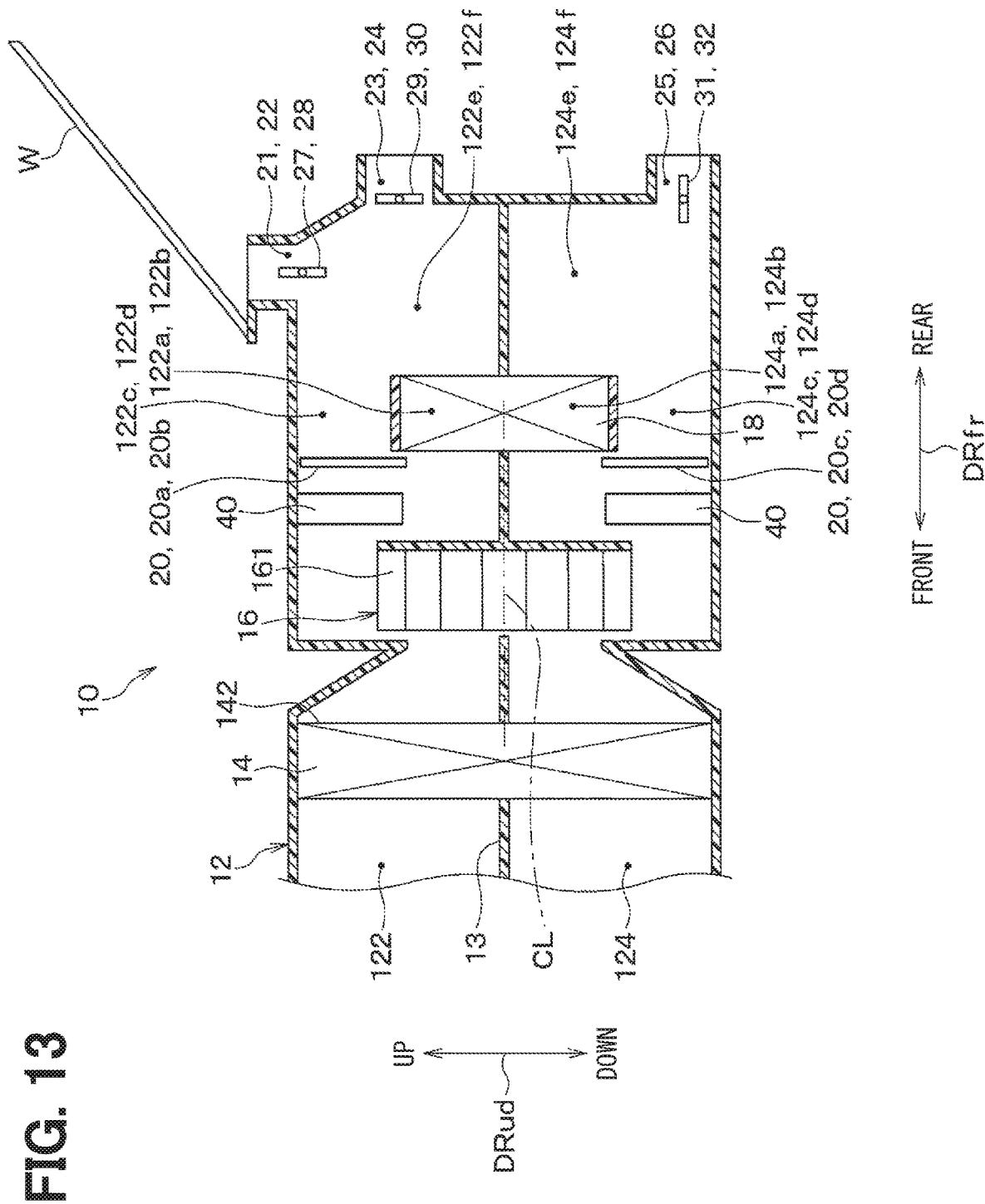
FIG. 13 is a schematic cross-sectional view of a vehicular air conditioner according to a modification to the second embodiment.

In the above-described second embodiment, the airflow adjuster 40 is disposed to cross over the entire area of both the outside air passage 122 and the inside air passage 124, but the present disclosure is not necessarily limited to this. In the vehicular air conditioner 1, the heater core 18 disposed downstream of the blower fan 16 may serve as an airflow adjuster. Thus, the vehicular air conditioner 1 may adopt a configuration in which, for example, an airflow adjuster 40 may be disposed upstream of only the outside air bypass passages 122c, 122d and the inside air bypass passages 124c, 124d, as shown in FIG. 13.

As described above, when the structure where the air flowing through the outside air bypass passages 122c and 122d and the inside air bypass passages 124c and 124d is adjusted by the airflow adjuster 40 is adopted, the air that does not pass through the heater core 18 can be adjusted. For this reason, it is possible to sufficiently suppress deterioration of the airflow balance between the air blown out toward the driver's seat DrS and the air blown out toward the passenger seat PaS due to the influence by the rotational component of the airflow blown out from the blower fan 16.

Further, in the above-described second embodiment, the airflow adjuster 40 is disposed between the blower fan 16 and the heater core 18, but the present disclosure is not necessarily limited to this. The airflow adjuster 40 may be arranged, for example, downstream of the heater core 18.

Furthermore, in the above-described second embodiment, the airflow adjuster 40 is configured by connecting a plurality of adjusting plates 41 to each other so as to form a rectangular grid shape. However, the present disclosure is not necessarily limited to this. For example, the airflow adjuster 40 may be formed of a gas-permeable filter formed of a net or a nonwoven fabric.

Third Embodiment

Next, a third embodiment will be described with reference to FIG. 14. The present embodiment is different from the first embodiment in that the relative positions of the inlet-side partition 132 disposed upstream of the blower fan 16 and the outlet-side partition 134 disposed downstream of the blower fan 16 are offset from each other in the rotational direction DRr of the blower fan 16. In the present embodiment, parts different from the first embodiment will be mainly described, and description of the same parts as the first embodiment will be omitted.

Figure 14:
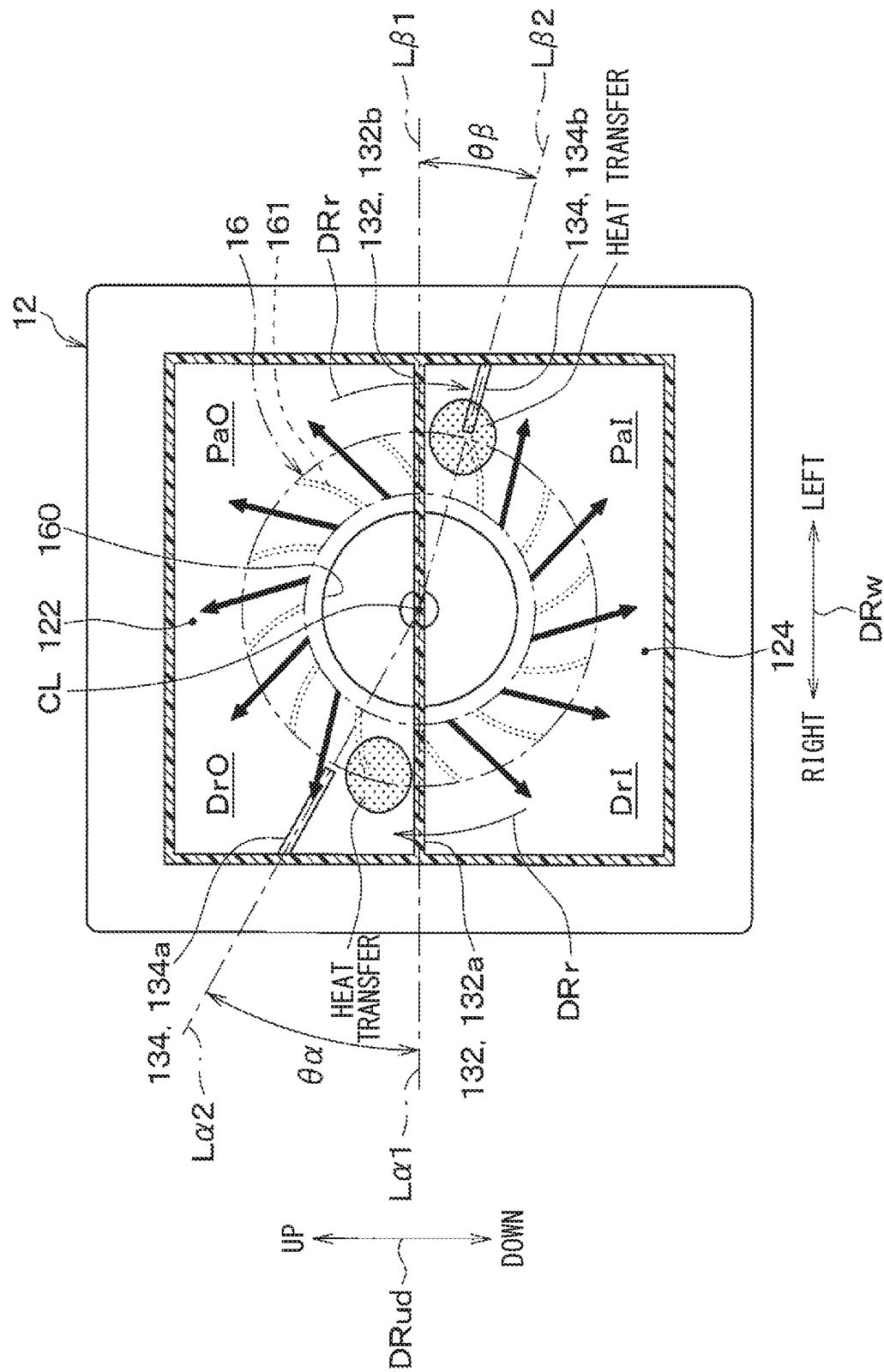
FIG. 14 is a cross-sectional view schematically illustrating an upstream side of a blower fan in a vehicular air conditioner according to a third embodiment.

As shown in FIG. 14, in the vehicular air conditioner 1 of the present embodiment, the outlet-side partition 134 is located at a position offset from the inlet-side partition 132 in the rotational direction DRr of the blower fan 16.

The inlet-side partition 132 of the present embodiment includes an inlet-side inner/outer partition portion 132a that partitions the first inside air space DrI from the first outside air space DrO and an inlet-side outer/inner partition 132b that partitions the second outside air space PaO from the second inside air space PaI.

The outlet-side partition 134 of the present embodiment includes an outlet-side inner/outer partition portion 134a that partitions the first inside air space DrI from the first outside air space DrO and an outlet-side outer/inner partition 134b that partitions the second outside air space PaO from the second inside air space PaI.

The outlet-side partition 134 is disposed so that the outlet-side inner/outer partition portion 134a is at an advancing position in the rotational direction DRr of the blower fan 16 with respect to the inlet-side inner/outer partition portion 132a. The outlet-side inner/outer partition portion 134a and the inlet-side inner/outer partition portion 132a of the present embodiment are arranged such that a relative angle $\theta\alpha$ in the rotational direction DRr of the blower fan 16 becomes acute (for example, 45°). This relative angle $\theta\alpha$ is an angle formed between a virtual line $L\alpha 1$, which connects the inlet-side inner/outer partition portion 132a and the fan axis CL, and a virtual line $L\alpha 2$, which connects the outlet-side inner/outer partition portion 134a and the fan axis CL.

The outlet-side partition 134 is disposed so that the outlet-side outer/inner partition 134b is at an advancing position in the rotational direction DRr of the blower fan 16 with respect to the inlet-side outer/inner partition 132b. In the present embodiment, the outlet-side outer/inner partition 134b and the inlet-side outer/inner partition 132b are arranged such that a relative angle $\theta\beta$ in the rotation direction DRr of the blower fan 16 is smaller than the relative angle $\theta\alpha$ between the outlet-side inner/outer partition portion 134a and the inlet-side inner/outer partition portion 132a. This relative angle $\theta\beta$ is an angle formed between a virtual line $L\beta 1$, which connects the inlet-side outer/inner partition 132b and the fan axis CL, and a virtual line $L\beta 2$, which connects the outlet-side outer/inner partition 134b and the fan axis CL.

The other configurations are the same as those of the first embodiment. In the vehicular air conditioner 1 of the present embodiment, the outlet-side inner/outer partition portion 134a is located at an advancing position in the rotational direction DRr of the blower fan 16 with respect to the inlet-side inner/outer partition portion 132a. Accordingly, in the blower fan 16, the blowing area of the inside air flowing through the first inside air space DrI is located at an advancing position in the rotational direction DRr of the blower fan 16 with respect to the drawing are of the inside air, and thus the inside air flowing through the first inside air space DrI can be suppressed to flow into the first outside air space DrO. Thus, the air having a relatively low humidity can be supplied to the driver's seat DrS to sufficiently secure the anti-fog performance.

In the vehicular air conditioner 1 of the present embodiment, the outlet-side outer/inner partition 134b is located at an advancing position in the rotation direction DRr of the blower fan 16 with respect to the inlet-side outer/inner partition 132b. Accordingly, in the blower fan 16, the blowing area of the outside air flowing through the second outside air space PaO is located at an advancing position in the rotation direction DRr of the blower fan 16 with respect to the drawing are of the inside air, and thus the outside air flowing through the second outside air space PaO can be suppressed to flow into the second inside air space PaI.

Here, if the relative angle $\theta\beta$ between the outlet-side outer/inner partition 134b and the inlet-side outer/inside partition 132b is enlarged, a portion of the inside air flowing through the drawing area of the blower fan 16 in the second inside air space PaI may be blown out to the blowing area of the blower fan 16 in the second outside air space PaO.

In view of this, in the vehicular air conditioner 1 of the present embodiment, the relative angle $\theta\beta$ between the outlet-side outer/inner partition 134b and the inlet-side outer/inner partition 132b is set to be smaller than the relative angle $\theta\alpha$ between the outlet-side inner/outer partition portion 134a and the inlet-side inner/outer partition portion 132a. Accordingly, the outside air flowing through the second outside air space PaO is regulated from flowing into the second inside air space PaI, and the inside air flowing through the second inside air space PaI is regulated from flowing into the second outside air space PaO.

Modification of the Third Embodiment

In the above-described third embodiment, the outlet-side outer/inner partition 134b is located at an advancing position in the rotational direction DRr of the blower fan 16 with respect to the inlet-side outer partition 132b, but it is not necessarily limited to this. The outlet-side partition 134 may be disposed so that the outlet-side outer/inner partition 134b is at the same position in the rotation direction DRr of the blower fan 16 as the inlet-side outer/inner partition 132b.

Fourth Embodiment

Next, a fourth embodiment will be described with reference to FIG. 15. The present embodiment is different from the first embodiment regarding the configuration of a blower fan 16A. In the present embodiment, parts different from the first embodiment will be mainly described, and description of the same parts as the first embodiment will be omitted.

Figure 15:
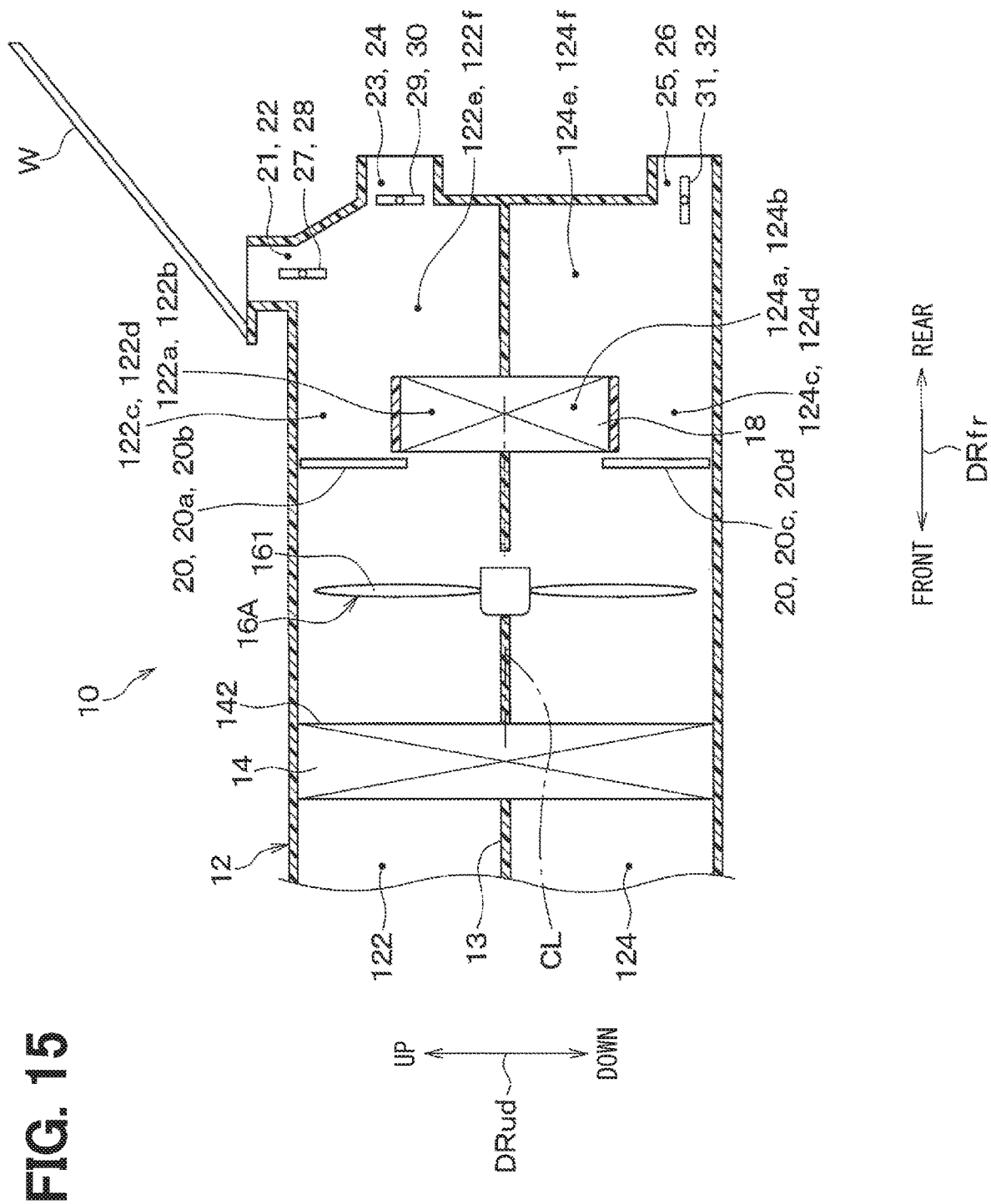
FIG. 15 is a cross-sectional view schematically illustrating a vehicular air conditioner according to a fourth embodiment.

As shown in FIG. 15, in the present embodiment, the blower fan 16A is configured as an axial flow fan that draws an air therein in a direction along the fan axis CL and blows the air in the direction along the fan axis CL.

The other configurations are the same as those of the first embodiment. Since the present embodiment has the same configuration as the vehicular air conditioner described in the first embodiment, the operation and effects described in the first embodiment can be applied to this embodiment.

Other Embodiments

Although representative embodiments of the present disclosure have been described above, the present disclosure is not limited to the embodiments described above, and various modifications can be made, for example, as follows.

In each of the above-described embodiments, the air mix door 20 is disposed between the blower fan 16 and the heater core 18, but the present disclosure is not necessarily limited to this. For example, the vehicular air conditioner 1 may have a configuration in which the air mix door 20 is disposed downstream of the heater core 18.

In each of the embodiments described above, the evaporator 14 is arranged upstream of the blower fan 16, but the present disclosure is not necessarily limited to this. For example, the vehicular air conditioner 1 may have a configuration where the evaporator 14 is disposed downstream of the air flow of the blower fan 16.

In each of the above-described embodiments, a centrifugal fan or an axial flow fan is used as a blower fan 16, but it is not necessarily limited thereto. The blower fan 16 may be, for example, a tilted flow fan.

In each of the above-described embodiments, the heater core 18 is used as a heating heat exchanger that heats an air, but the present disclosure is not necessarily limited thereto. The vehicular air conditioner 1 may use, for example, an electric heater or the like as a heating heat exchanger.

In the embodiments described above, it is needless to say that the elements configuring the embodiments are not necessarily essential except in the case where those elements are clearly indicated to be essential in particular, the case where those elements are considered to be obviously essential in principle, and the like.

In the embodiments described above, the present disclosure is not limited to the specific number of components of the embodiments, except when numerical values such as the number, numerical values, quantities, ranges, and the like are referred to, particularly when it is expressly indispensable, and when it is obviously limited to the specific number in principle, and the like.

In the embodiments described above, when referring to the shape, positional relationship, and the like of a component and the like, the present disclosure is not limited to the shape, positional relationship, and the like, except for the case of being specifically specified, the case of being fundamentally limited to a specific shape, positional relationship, and the like, and the like.

Overview

According to a first aspect as shown in a part or all of the above-described embodiments, in the vehicular air conditioner, the heating heat exchanger is disposed in the casing at a position downstream of the blower fan. Then, the blower fan rotates the blades in the rotational direction such that the blades pass through the first inside air space, the first outside air space, the second outside air space, and the second inside air space in this order.

According to a second aspect, the vehicular air conditioner includes the airflow adjuster that is disposed downstream of the blower fan in the casing, wherein the airflow adjuster is configured to adjust a flow of the air blown from the blower fan so that a velocity component of the air in a rotational direction of the blower fan is reduced.

In this way, if the airflow adjuster is arranged downstream of the blower fan, the airflow at a downstream side of the blower fan can be adjusted. For this reason, it is possible to avoid deterioration of the airflow balance between the air blown out toward the driver's seat and the air blown out toward the passenger seat due to the influence by the speed component of the airflow in the rotation direction (that is, the rotational component) that is blown out from the blower fan.

According to a third aspect, in the vehicular air conditioner, the outside air passage includes, at a position downstream of the blower fan, the outside air heating passage through which the air blown from the blower fan flows toward the heating heat exchanger and an outside air bypass passage that has the air blown from the blower fan bypass the heating heat exchanger. The inside air passage includes, at a position downstream of the blower fan, the inside air heating passage through which the air blown from the blower fan flows toward the heating heat exchanger and the inside air bypass passage that has the air blown from the blower fan bypass the heating heat exchanger. Then, the airflow adjuster is configured to adjust at least a flow of an air flowing through the outside air bypass passage and the inside air bypass passage.

In this way, since the air flowing through the outside air bypass passages and the inside air bypass passages is adjusted by the airflow adjuster, the air that does not pass through the heater core can also be adjusted. For this reason, it is possible to sufficiently suppress deterioration of the airflow balance between the air blown out toward the driver's seat and the air blown out toward the passenger seat due to the influence by the velocity component in the rotational direction of the airflow blown out from the blower fan 16.

According to a fourth aspect, in the vehicular air conditioner, the airflow adjuster is disposed between the blower fan and the heating heat exchanger. Accordingly, it is possible to regulate the air from locally flowing into a part of the heating heat exchanger, and thus it is possible to sufficiently secure an air heating region in the heating heat exchanger.

According to a fifth aspect, in the vehicular air conditioner, the heating heat exchanger includes the heat medium flow passage through which a medium for heating an air flows and the heat transfer promoting portion that is configured to promote heat exchange between the air and the heat medium. Then, the heat exchanger is configured to adjust the airflow blown out from the blower fan is adjusted by having air flow through the plurality of heat exchange channels defined between the heat medium flow passage and the heat transfer promoting portion so that the velocity component of the air in the rotational direction of the blow fan is reduced. As described above, the vehicular air conditioner may utilize the heating heat exchanger as an airflow adjuster.

According to a sixth aspect, the vehicular air conditioner includes the inlet-side partition that is disposed upstream of the blower fan in the casing and that separates the outside air passage from the inside air passage, and the outlet-side partition that is disposed downstream of the blower fan in the casing and that separates the outside air passage from the inside air passage. The outlet-side partition includes an outlet-side inner/outer partition portion that separates the first inside air space from the first outside air space, the inlet-side partition includes an inlet-side inner/outer partition portion that separates the first inside air space from the first outside air space, and the outlet-side inner/outer partition portion is located at an advancing position in a rotational direction of the blower fan relative to the inlet-side inner/outer partition portion.

The inside air flowing through the first inside air space is blown out from an area at an advancing position in the rotational direction of the blower fan with respect to an area where the air is drawn into the blower fan due to the rotation of the blower fan. For this reason, in the blower fan, if the drawing area and the blowing area for the inside air flowing through the first inside air space are located at the same positions in the rotational direction of the blower fan, a part of the inside air flowing through the first inside air space would flow into the first outside air space.

In view of the above, in the present embodiment, the outlet-side inner/outer partition is arranged at an advancing position in the rotation direction of the blower fan with respect to the inlet-side inner/outer partition. Accordingly, in the blower fan, the blowing area of the inside air flowing through the first inside air space is located at an advancing position in the rotation direction of the blower fan with respect to the drawing are of the inside air, and thus the inside air flowing through the first inside air space can be suppressed to flow into the first outside air space.

Here, the relative angle in the rotational direction of the blower fan between the outlet side inner/outer partition and the inlet-side inner/outer partition is defined by the virtual line connecting the inlet-side inner/outer partition and the rotation center of the blower fan and the virtual line connecting the outlet-side inner/outer partition and the rotation center of the blow fan.

According to a seventh aspect, in the outlet-side partition of the vehicular air conditioner, the outlet-side inner/outer partition portion that separates the first inside air space from the first outside air space is located at an advancing position in the rotational direction of the blower fan with respect to the inlet-side inner/outer partition portion of the inlet-side partition that separates the first inside air space from the first outside air space. The outlet-side outer/inner partition and the inlet-side outer/inner partition are arranged such that the relative angle in the rotational direction of the blower fan is smaller than the relative angle in the rotational direction of the blower fan between the outlet-side inner/outer partition and the inlet-side inner/outer partition.

The outside air flowing through the second inside air space is blown out from an area at an advancing position in the rotational direction of the blower fan with respect to an area where the air is drawn into the blower fan due to the rotation of the blower fan. For this reason, in the blower fan, if the drawing area and the blowing area for the outside air flowing through the second outside air space are located at the same positions in the rotational direction of the blower fan, a part of the outside air would flow into the second inside air space.

It is assumed that the outlet-side outer/inner partition is arranged at an advancing position in the rotation direction of the blower fan with respect to the inlet-side outer/inner partition.

However, if the relative angle in the rotational direction of the blower fan between the outlet-side outer/inner partition and the inlet-side outer/inside partition is increased, a portion of the inside air flowing through the drawing area of the blower fan in the second inside air space may be blown out to the blowing area of the blower fan in the second outside air space.

In the present disclosure, the outlet-side outer/inner partition and the inlet-side outer/inner partition are arranged such that the relative angle in the rotational direction of the blower fan is smaller than the relative angle in the rotational direction of the blower fan between the outlet-side inner/outer partition and the inlet-side inner/outer partition. Accordingly, the outside air flowing through the second outside air space is regulated from flowing into the second inside air space, and the inside air flowing through the second inside air space is regulated from flowing into the second outside air space.

Here, the relative angle in the rotational direction of the blower fan between the outlet side outer/inner partition and the inlet-side outer/inner partition is defined by the virtual line connecting the inlet-side outer/inner partition and the rotation center of the blower fan and the virtual line connecting the outlet-side outer/inner partition and the rotation center of the blow fan.

The invention claimed is:

1. A vehicular air conditioner that conditions air in a vehicle cabin, the conditioner comprising:
   a casing that defines an air passage through which air flows;
   a blower fan that includes a plurality of blades arranged in a circumferential direction about a fan axis, the blower fan configured to generate an airflow in the air passage to be supplied to the vehicle cabin by rotating the plurality of blades about the fan axis in a rotational direction; and
   a heating heat exchanger that is disposed in the casing to heat the air flowing through the air passage, wherein
   the air passage is divided into an outside air passage through which outside air from outside of the vehicle cabin flows and an inside air passage through which inside air in the vehicle cabin circulates,
   the heating heat exchanger is disposed downstream of the blower fan in the casing, the outside air passage includes a first outside air space through which the outside air is guided to a driver seat in the vehicle cabin and a second outside air space through which the outside air is guided to a passenger seat in the vehicle cabin, the inside air passage includes a first inside air space through which the inside air is guided to the driver seat in the vehicle cabin and a second inside air space through which the inside air is guided to the passenger seat in the vehicle cabin, the blower fan is disposed to extend over the first outside air space, the second outside air space, the first inside air space, and the second inside air space, and the rotational direction of the blower fan is set so that each of the plurality of blades of the blower fan passes through the first inside air space, the first outside air space, the second outside air space, and the second inside air space in this order when the plurality of blades are rotating.

2. The vehicular air conditioner according to claim 1, further comprising an airflow adjuster that is disposed downstream of the blower fan in the casing, wherein the airflow adjuster is configured to adjust a flow of the air blown from the blower fan so that a velocity component of the air in the rotational direction of the blower fan is reduced.

3. The vehicular air conditioner according to claim 2, wherein the outside air passage includes, at a position downstream of the blower fan, an outside air heating passage through which the air blown from the blower fan flows toward the heating heat exchanger and an outside air bypass passage through which the air blown from the blower fan bypasses the heating heat exchanger, the inside air passage includes, at a position downstream of the blower fan, an inside air heating passage through which the air blown from the blower fan flows toward the heating heat exchanger and an inside air bypass passage through which the air blown from the blower fan bypasses the heating heat exchanger, and the airflow adjuster is configured to adjust at least a flow of air flowing through the outside air bypass passage and a flow of air flowing through the inside air bypass passage.

4. The vehicular air conditioner according to claim 2, wherein the airflow adjuster is disposed between the blower fan and the heating heat exchanger.

5. The vehicular air conditioner according to claim 1, wherein the heating heat exchanger includes a heating medium circulation portion through which a heating medium for heating the air flows and a heat transfer promoting portion that promotes heat exchange between the air and the heating medium, the heating medium circulation portion and the heat transfer promoting portion define a plurality of heat exchange channels between the heating medium circulation portion and the heat transfer promoting portion, and the vehicular air conditioner is operable such that the flow of the air blown from the blower fan is adjusted when the air flows through the plurality of heat exchange channels so that a velocity component of the air in the rotational direction of the blower fan is reduced.

6. The vehicular air conditioner according to claim 1, further comprising:

an inlet-side partition that is disposed upstream of the blower fan in the casing and that separates the outside air passage from the inside air passage; and an outlet-side partition that is disposed downstream of the blower fan in the casing and that separates the outside air passage from the inside air passage, wherein the outlet-side partition includes an outlet-side inner/outer partition portion that separates the first inside air space from the first outside air space, the inlet-side partition includes an inlet-side inner/outer partition portion that separates the first inside air space from the first outside air space, and the outlet-side inner/outer partition portion is located at an advancing position in the rotational direction of the blower fan relative to the inlet-side inner/outer partition portion.

7. The vehicular air conditioner according to claim 6, wherein the outlet-side partition includes an outlet-side outer/inner partition portion that separates the second outside air space from the second inside air space, the inlet-side partition includes an inlet-side outer/inner partition portion that separates the second outside air space from the first inside air space, the outlet-side outer/inner partition portion is located at an advancing position in the rotational direction of the blower fan relative to the inlet-side outer/inner partition portion, and the outlet-side outer/inner partition portion and the inlet-side outer/inner partition portion form a relative angle in the rotational direction of the blower fan that is smaller than a relative angle in the rotational direction of the blower fan formed between the outlet-side inner/outer partition portion and the inlet-side inner/outer partition portion.

* * * * *